US012049775B2

(12) United States Patent
Xia et al.

(10) Patent No.: US 12,049,775 B2
(45) Date of Patent: Jul. 30, 2024

(54) REFRIGERATOR

(71) Applicants: QINGDAO HAIER REFRIGERATOR CO., LTD., Qingdao (CN); HAIER SMART HOME CO., LTD., Qingdao (CN)

(72) Inventors: Enpin Xia, Qingdao (CN); Hao Zhang, Qingdao (CN); Xiaobing Zhu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 239 days.

(21) Appl. No.: 17/629,401

(22) PCT Filed: Jan. 15, 2020

(86) PCT No.: PCT/CN2020/072251
§ 371 (c)(1),
(2) Date: Jan. 23, 2022

(87) PCT Pub. No.: WO2021/012655
PCT Pub. Date: Jan. 28, 2021

(65) Prior Publication Data

US 2022/0259907 A1 Aug. 18, 2022

(30) Foreign Application Priority Data

Jul. 23, 2019 (CN) ......................... 201910667526.8

(51) Int. Cl.
*F25D 23/02* (2006.01)
*E05D 3/18* (2006.01)

(52) U.S. Cl.
CPC ............ *E05D 3/18* (2013.01); *F25D 23/028* (2013.01); *E05Y 2900/31* (2013.01); *F25D 2323/021* (2013.01); *F25D 2323/024* (2013.01)

(58) Field of Classification Search
CPC ............ F25D 23/028; F25D 2323/024; F25D 2323/021; E05D 3/18; E05D 7/0407;
(Continued)

(56) References Cited

U.S. PATENT DOCUMENTS 2,793,387 A * 5/1957 Odell ........................ E05D 3/18 16/358
2,867,839 A * 1/1959 Squire ....................... E05D 3/18 16/358
(Continued)

FOREIGN PATENT DOCUMENTS

CN 1432781 A 7/2003
CN 101501288 A 8/2009
(Continued)

*Primary Examiner* — Hiwot E Tefera
(74) *Attorney, Agent, or Firm* — Cheng-Ju Chiang

(57) ABSTRACT

The present invention discloses a refrigerator, including a cabinet, a door for opening and closing the cabinet, and a hinge assembly for connecting the cabinet and the door, wherein the cabinet includes an accommodating chamber and an outer side surface adjacent to the hinge assembly and located on an extension section of a rotation path of the door, a direction from the accommodating chamber towards the outer side surface serves as a first direction, and when the door is in an opening process, the hinge assembly drives the door to move away from the cabinet in the first direction. In the present invention, the door may be driven to move away from the cabinet in the first direction by the hinge assembly; that is, the door moves away from the accommodating chamber, thus guaranteeing an opening degree of the cabinet.

10 Claims, 23 Drawing Sheets

(58) Field of Classification Search
CPC ........... E05D 5/14; E05D 7/081; E05D 5/046; E05D 5/10; E05D 5/12; E05D 11/06; E05D 7/085; E05Y 2900/31; E05F 5/06
See application file for complete search history.

(56) References Cited

U.S. PATENT DOCUMENTS

| | | | | | |
|---|---|---|---|---|---|
| 3,001,225 | A * | 9/1961 | Squire | E05F 1/1276 16/358 | |
| 3,065,498 | A * | 11/1962 | Johnson | E05D 3/18 16/359 | |
| 3,083,403 | A * | 4/1963 | Van Noord | E05D 3/18 16/361 | |
| 9,376,845 | B2 * | 6/2016 | Sawaguchi | E05D 3/18 | |
| 9,380,863 | B2 * | 7/2016 | Sakanoue | B60N 3/004 | |
| 10,876,333 | B2 * | 12/2020 | Zhang | F25D 23/028 | |
| 2002/0104191 | A1 | 8/2002 | Matteau | | |
| 2003/0132689 | A1 * | 7/2003 | Shin | E05D 3/18 312/405 | |
| 2008/0301909 | A1 * | 12/2008 | Chien | G06F 1/1624 16/362 | |
| 2012/0025686 | A1 * | 2/2012 | Darney | E05D 3/18 312/405 | |
| 2013/0264930 | A1 * | 10/2013 | Kim | E05F 1/00 312/405 | |
| 2014/0232250 | A1 * | 8/2014 | Kim | F25D 23/028 312/292 | |
| 2016/0252291 | A1 * | 9/2016 | Kikuchi | F25D 23/028 312/405 | |
| 2019/0186183 | A1 * | 6/2019 | He | E05D 5/04 | |

FOREIGN PATENT DOCUMENTS

| | | | | | |
|---|---|---|---|---|---|
| CN | 203274419 | U | | 11/2013 | |
| CN | 203561139 | U | | 4/2014 | |
| CN | 104797167 | A | | 7/2015 | |
| CN | 107178268 | A | | 9/2017 | |
| CN | 107288463 | A | * | 10/2017 | E05D 11/06 |
| CN | 109470008 | A | | 3/2019 | |
| DE | 102005047080 | B3 | * | 11/2006 | E05D 3/022 |
| FR | 2526530 | A1 | | 11/1983 | |
| JP | S63-123976 | A | | 5/1988 | |
| JP | 3756909 | B2 | | 3/2006 | |
| JP | 2009-97812 | A | | 5/2009 | |

* cited by examiner

REFRIGERATOR

The present application is a 35 U.S.C. § 371 National Phase conversion of International (PCT) Patent Application No. PCT/CN2020/072251, filed on Jan. 15, 2020, which claims priority to Chinese Patent Application No. 201910667526.8, entitled "Refrigerator", filed on Jul. 23, 2019, the disclosure of which is incorporated herein by reference in its entirety. The PCT International Patent Application was filed and published in Chinese.

TECHNICAL FIELD

The present invention relates to the field of household appliance technologies, and in particular, to a refrigerator.

BACKGROUND

Currently, single-shaft hinge assemblies are used in refrigerators, and a door makes circular motion around a fixed shaft of the hinge assembly to be opened and closed, and in an actual operation, since the door is always in a state of rotating in situ relative to a cabinet, an opening degree of the cabinet may be affected.

In view of this, the existing refrigerator is necessary to be improved to solve the above-mentioned problem.

SUMMARY

An object of the present invention is to provide a refrigerator which may effectively improve smoothness of opening a door.

In order to achieve one of the above objects of the present invention, an embodiment of the present invention provides a refrigerator, comprising a cabinet, a door for opening and closing the cabinet, and a hinge assembly for connecting the cabinet and the door, the cabinet comprises an accommodating chamber and an outer side surface adjacent to the hinge assembly and located on an extension section of a rotation path of the door, a direction from the accommodating chamber towards the outer side surface serves as a first direction, and when the door is in an opening process, the hinge assembly drives the door to move away from the cabinet in the first direction.

As a further improvement of an embodiment of the present invention, the door comprises a door gravity center, and when the door is in the opening process, the hinge assembly drives the door to move away from the cabinet in the first direction, and meanwhile, the hinge assembly drives the door gravity center to move towards the cabinet.

As a further improvement of an embodiment of the present invention, the hinge assembly comprises a first shaft, a first groove, a second shaft and a second groove, the first shaft and the first groove are fitted with each other, the second shaft and the second groove are fitted with each other, the first shaft is located in one of the cabinet and the door, the first groove is located in the other of the cabinet and the door, the second shaft is located in one of the cabinet and the door, and the second groove is located in the other of the cabinet and the door.

As a further improvement of an embodiment of the present invention, the first shaft and the second shaft are located at the cabinet, and the first groove and the second groove are located at the door.

As a further improvement of an embodiment of the present invention, the first groove comprises an initial position and a pivot position, and the second groove comprises a first end, a second end, a first section and a second section, the first end and the second end being provided oppositely, and the first section and the second section being located between the first end and the second end and connected with each other; when the door is in the closed state, the first shaft is located at the initial position, and the second shaft is located at the first end; when the door is opened from the closed state to a first opening angle, the second shaft moves in the first section to drive the first shaft to move from the initial position to the pivot position, and the door moves away from the cabinet in the first direction; when the door is continuously opened from the first opening angle to a maximum opening angle, the first shaft is kept at the pivot position, and the second shaft moves in the second section around the first shaft.

As a further improvement of an embodiment of the present invention, the first groove comprises an initial position and a pivot position, and the second groove comprises a first end, a second end, a first section, a second section and a third section, the first end and the second end being provided oppositely, and the first section, the second section and the third section being located between the first end and the second end and connected; when the door is in the closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a second opening angle, the second shaft moves in the second section to drive the first shaft to move from the initial position to the pivot position, and the door moves away from the cabinet in the first direction; when the door is continuously opened from the second opening angle to a maximum opening angle, the first shaft is kept at the pivot position, and the second shaft moves in the third section around the first shaft.

As a further improvement of an embodiment of the present invention, the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

As a further improvement of an embodiment of the present invention, the door comprises a front wall apart from the cabinet and a side wall always interposed between the front wall and the cabinet, a distance between the initial position and the front wall is greater than a distance between the pivot position and the front wall, and a distance between the initial position and the side wall is less than a distance between the pivot position and the side wall.

As a further improvement of an embodiment of the present invention, the door comprises a front wall apart from the cabinet and a side wall always interposed between the front wall and the cabinet, a distance between the initial position and the front wall is less than a distance between the pivot position and the front wall, and a distance between the initial position and the side wall is less than a distance between the pivot position and the side wall.

As a further improvement of an embodiment of the present invention, the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the door is in the closed state, the vertical beam extends to the second door; when the door is opened from the closed state to the first opening angle, the vertical beam rotates towards a side close to the cabinet, such that a first folding angle is formed between the first door and the vertical beam, and when the door is continuously opened from the first opening angle to the maximum opening angle, the vertical beam and the first door are kept relatively static.

In order to achieve one of the above objects of the present invention, an embodiment of the present invention provides a refrigerator, comprising a cabinet, a door for opening and closing the cabinet, and a hinge assembly for connecting the cabinet and the door, the cabinet comprises an accommodating chamber and an outer side surface adjacent to the hinge assembly and located on an extension section of a rotation path of the door, and a direction from the accommodating chamber towards the outer side surface serves as a first direction; the hinge assembly comprises a first shaft, a first groove, a second shaft and a second groove, the first shaft and the first groove are fitted with each other, and the second shaft and the second groove are fitted with each other; the first groove comprises an initial position and a pivot position, and the second groove comprises a first end, a second end, a first section and a second section, the first end and the second end being provided oppositely, and the first section and the second section being located between the first end and the second end and connected with each other; when the door is in the closed state, the first shaft is located at the initial position, and the second shaft is located at the first end; when the door is opened from the closed state to a first opening angle, the second shaft moves in the first section to drive the first shaft to move from the initial position to the pivot position, and the door moves away from the cabinet in the first direction; when the door is continuously opened from the first opening angle to a maximum opening angle, the first shaft is kept at the pivot position, and the second shaft moves in the second section around the first shaft.

Compared with a prior art, the present invention has the beneficial effects as follows. In an embodiment of the present invention, the door may be driven to move away from a cabinet in a first direction by a hinge assembly; that is, the door moves away from an accommodating chamber, thus guaranteeing an opening degree of the cabinet, and avoiding a problem that drawers, racks, or the like, in the cabinet are unable to be opened due to interference of the door.

DETAILED DESCRIPTION

Figure 1:
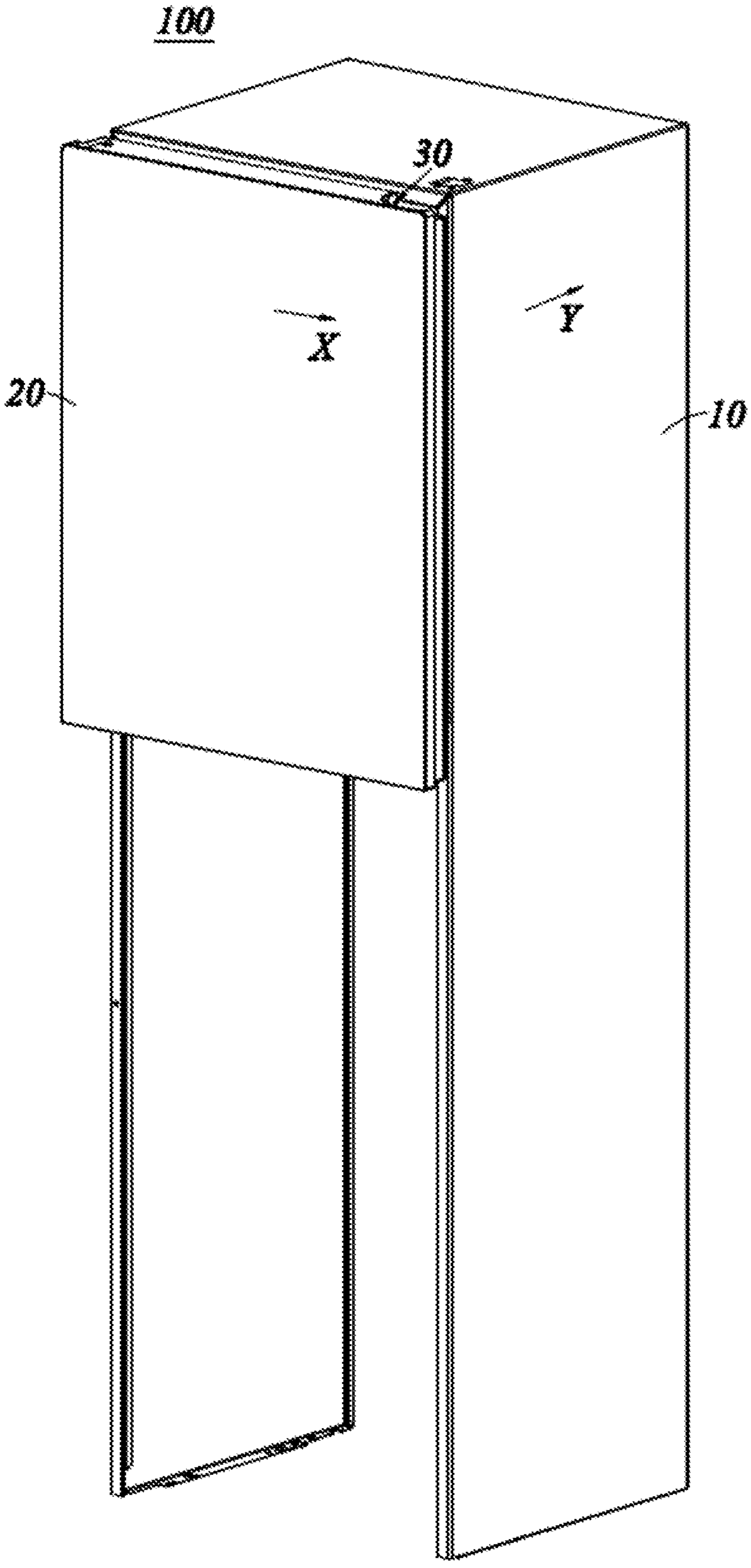
FIG. 1 is a perspective view of a refrigerator according to a first embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

Figure 2:
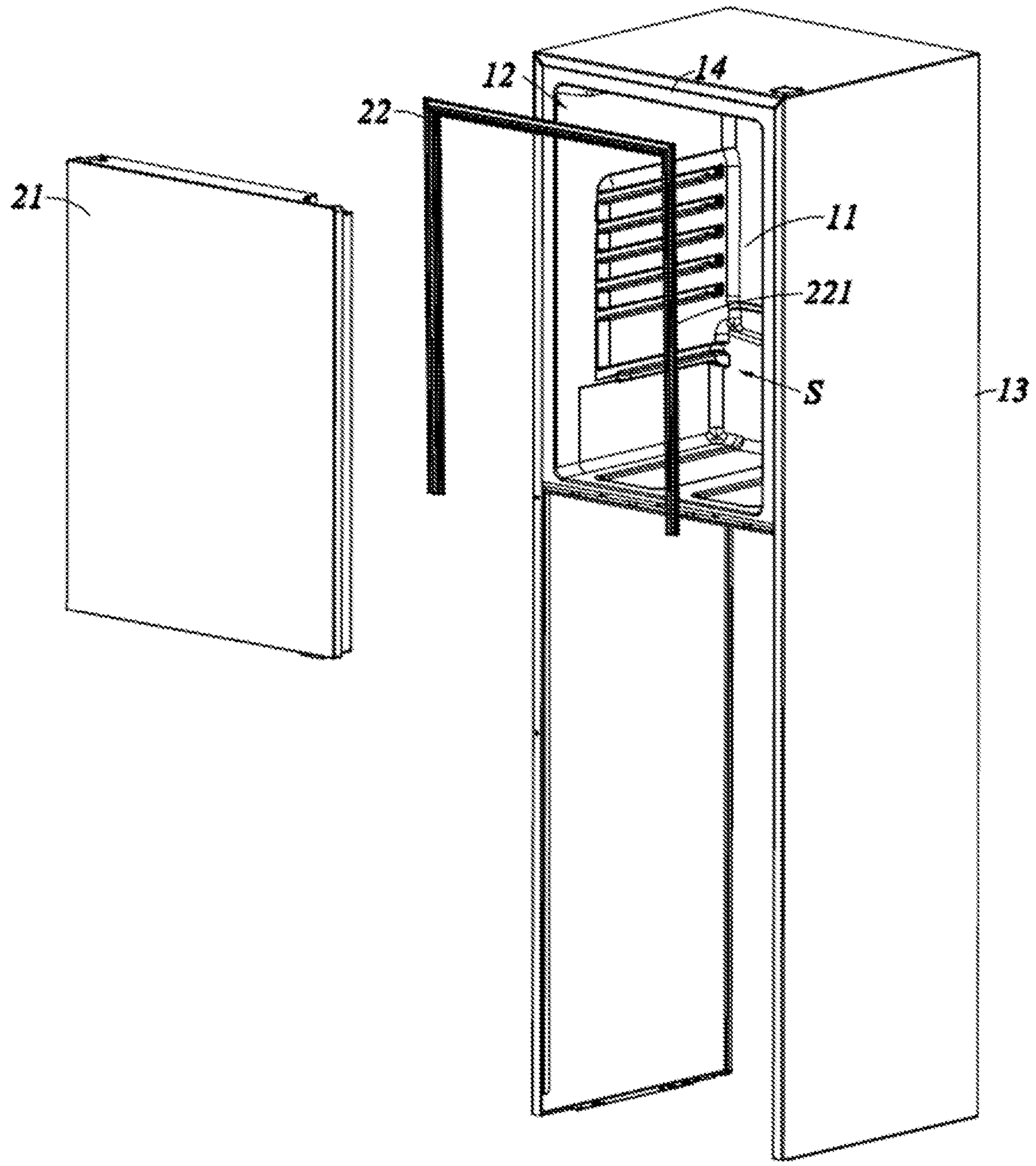
FIG. 2 is an exploded view of the refrigerator according to the first embodiment of the present invention.
Figure 3:
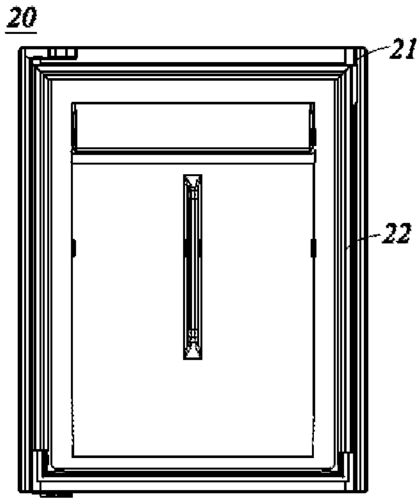
FIG. 3 is a schematic diagram of a door in the first embodiment of the present invention.

FIGS. 1 to 3 are schematic diagrams of a refrigerator 100 according to a first embodiment of the present invention.

The refrigerator 100 includes a cabinet 10, a door 20 for opening and closing the cabinet 10, and a hinge assembly 30 for connecting the cabinet 10 and the door 20.

The cabinet 10 includes an accommodating chamber S and an outer side surface 13 adjacent to the hinge assembly 30 and located on an extension section of a rotation path of the door 20, and a direction from the accommodating chamber S towards the outer side surface 13 serves as a first direction X.

When the door 20 is in an opening process, the hinge assembly 30 drives the door 20 to move away from the cabinet 10 in the first direction X.

Here, in the opening process of the door 20, the door 20 moves away from the cabinet 10 in the first direction X; that is, the door 20 moves away from the accommodating chamber S, such that the door 20 may be as far away from the cabinet 10 as possible in the first direction X, thus guaranteeing an opening degree of the cabinet 10, and avoiding a problem that drawers, racks, or the like, in the cabinet 10 are unable to be opened due to interference of the door 20.

In the present embodiment, an opening 12 is provided in a front end of the accommodating chamber S, and the cabinet 10 further includes a front end surface 14 provided around the opening 12.

Here, an end surface of the cabinet 10 close to the door 20 serves as the front end surface 14.

The door 20 includes a door body 21 and a door gasket 22 connected to each other, and the door gasket 22 includes a side door gasket 221 close to the outer side surface 13.

Here, the door gasket 22 is annularly provided on a side surface of the door body 21 close to the cabinet 10, and the side door gasket 221 is a door gasket provided closest to the hinge assembly 30 in a vertical direction.

When the door 20 is in a closed state, the door gasket 22 and the front end surface 14 contact each other.

Here, the door gasket 22 and the front end surface 14 contact each other to achieve a sealing fitting effect between the door 20 and the cabinet 10, and generally, a sealing effect may be improved by pressurization, magnetic attraction, and other actions of the door gasket 22.

When the door 20 is in the opening process, the hinge assembly 30 drives the side door gasket 221 to move in the first direction X.

Here, in an initial opening process of the door 20, rotation of the door 20 drives the side door gasket 221 to move in a direction opposite to the first direction X; the hinge assembly 30 in the present embodiment drives the side door gasket 221 to move in the first direction X, such that an amount of movement of the side door gasket 221 in the direction opposite to the first direction X may be reduced effectively, thereby preventing the side door gasket 221 from obstructing an opening operation of the drawer, the rack, or the like, in the cabinet 10.

In the present embodiment, the door 20 includes a door gravity center, and when the door 20 is in the opening process, the hinge assembly 30 drives the door 20 to move away from the cabinet 10 in the first direction X, and at the same time, the hinge assembly 30 drives the door gravity center to move towards the cabinet 10.

Here, the door gravity center is defined as an action point of a resultant force of gravities of all parts of the door 20, the door 20 has a large dead weight, and the door 20 is selectively provided with a bottle seat, a dispenser, an ice maker and other components, such that the weight of the door 20 is further increased to cause a toppling and falling risk of the whole refrigerator 100, but the hinge assembly 30 in the present embodiment may drive the door gravity center to move towards the cabinet 10, thereby effectively preventing the refrigerator 100 from toppling and falling.

Specifically, a direction from the door 20 towards the cabinet 10 serves as a second direction Y; when the door 20 is in the opening process, the door gravity center moves towards the cabinet 10 in the second direction Y, and at this point, the door gravity center is close to the cabinet 10, thus improving a stability of the whole refrigerator 100.

It should be noted that, in the opening process of the door 20 in the present embodiment, the hinge assembly 30 simultaneously drives the door 20 to move in the first direction X and the door gravity center to move towards the cabinet 10; that is, the opening degree of the door 20 is increased while the refrigerator 100 is prevented from toppling and falling.

Figure 4:
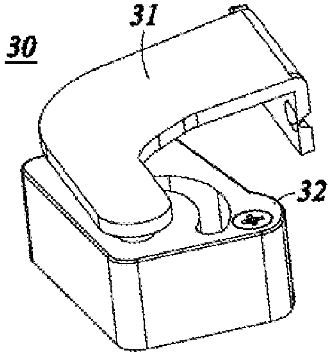
FIG. 4 is a schematic diagram of a hinge assembly in the first embodiment of the present invention.
Figure 5:
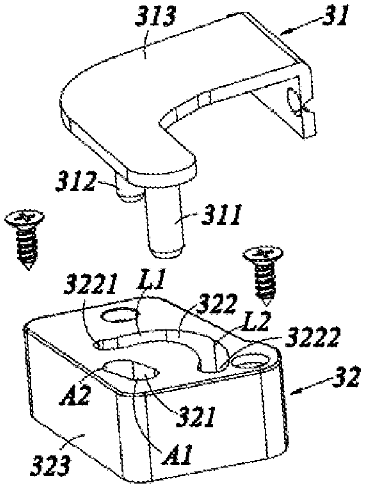
FIG. 5 is an exploded view of the hinge assembly in the first embodiment of the present invention.

Referring to FIGS. 4 and 5, in the present embodiment, the hinge assembly 30 includes a first shaft 311, a first groove 321, a second shaft 312 and a second groove 322, the first shaft 311 and the first groove 321 are fitted with each other, the second shaft 312 and the second groove 322 are fitted with each other, the first shaft 311 is located in one of the cabinet 10 and the door 20, the first groove 321 is located in the other of the cabinet 10 and the door 20, the second shaft 312 is located in one of the cabinet 10 and the door 20, and the second groove 322 is located in the other of the cabinet 10 and the door 20.

That is, the hinge assembly 30 may be distributed in various ways; in a first example, the first shaft 311 and the second shaft 312 are located at the cabinet 10, and the first groove 321 and the second groove 322 are located at the door 20; in a second example, the first shaft 311 and the second shaft 312 are located at the door 20, and the first groove 321 and the second groove 322 are located at the cabinet 10; in a third example, the first shaft 311 and the second groove 322 are located at the cabinet 10, and the first groove 321 and the second shaft 312 are located at the door 20; in a fourth example, the first shaft 311 and the second groove 322 are located at the door 20, and the first groove 321 and the second shaft 312 are located at the cabinet 10.

Here, the first example is taken as an example; that is, the first shaft 311 and the second shaft 312 are located at the cabinet 10, and the first groove 321 and the second groove 322 are located at the door 20.

Specifically, the hinge assembly 30 includes a first hinge part 32 and a second hinge part 31 which are fitted with each other, the first hinge part 32 is located at the door 20, and the second hinge part 31 is located at the cabinet 10.

The first hinge part 32 includes a first hinge part body 323, as well as the first groove 321 and the second groove 322 recessed in the first hinge part body 323.

The second hinge part 31 includes a second hinge part body 313, as well as the first shaft 311 and the second shaft 312 protruding from the second hinge part body 313, and the second hinge part body 313 and the cabinet 10 are fixed to each other.

First Specific Example

In the first specific example, referring to FIGS. 6 to 11, the first groove 321 includes an initial position A1 and a pivot position A2, and the second groove 322 includes a first end 3221, a second end 3222, a first section L1 and a second section L2, the first end 3221 and the second end 3222 being provided oppositely, and the first section L1 and the second section L2 being located between the first end 3221 and the second end 3222 and connected with each other.

Figure 6:
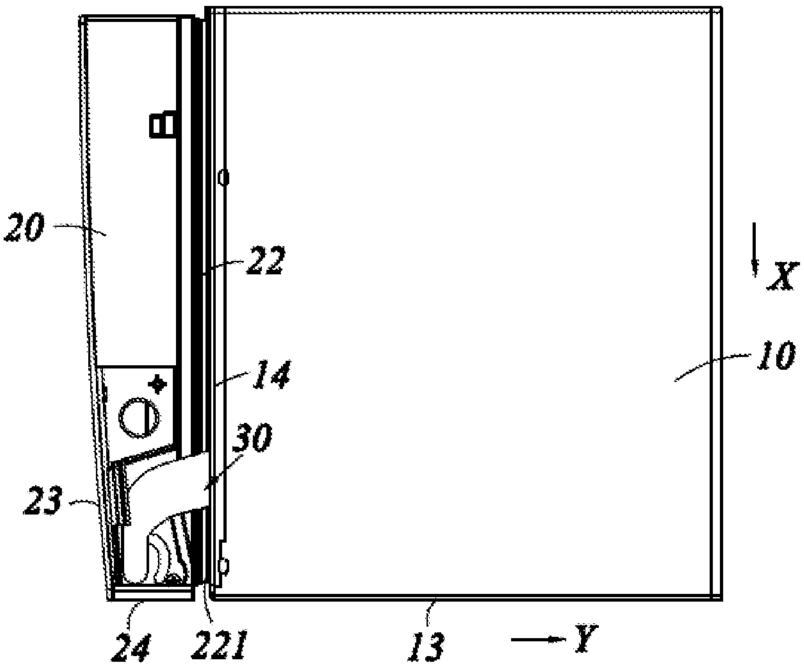
FIG. 6 is a top view of the refrigerator in a first specific example of the first embodiment in a closed state.
Figure 7:
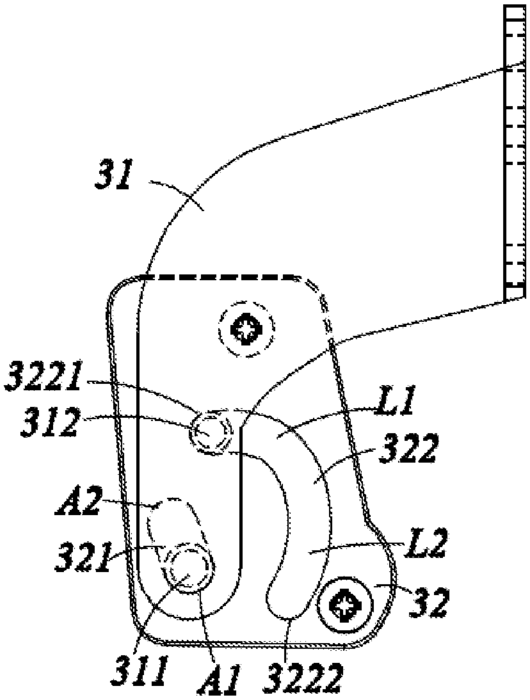
FIG. 7 is a perspective view of the hinge assembly in FIG. 6.

Referring to FIGS. 6 and 7, when the door 20 is in the closed state, the first shaft 311 is located at the initial position A1, and the second shaft 312 is located at the first end 3221.

Figure 8:
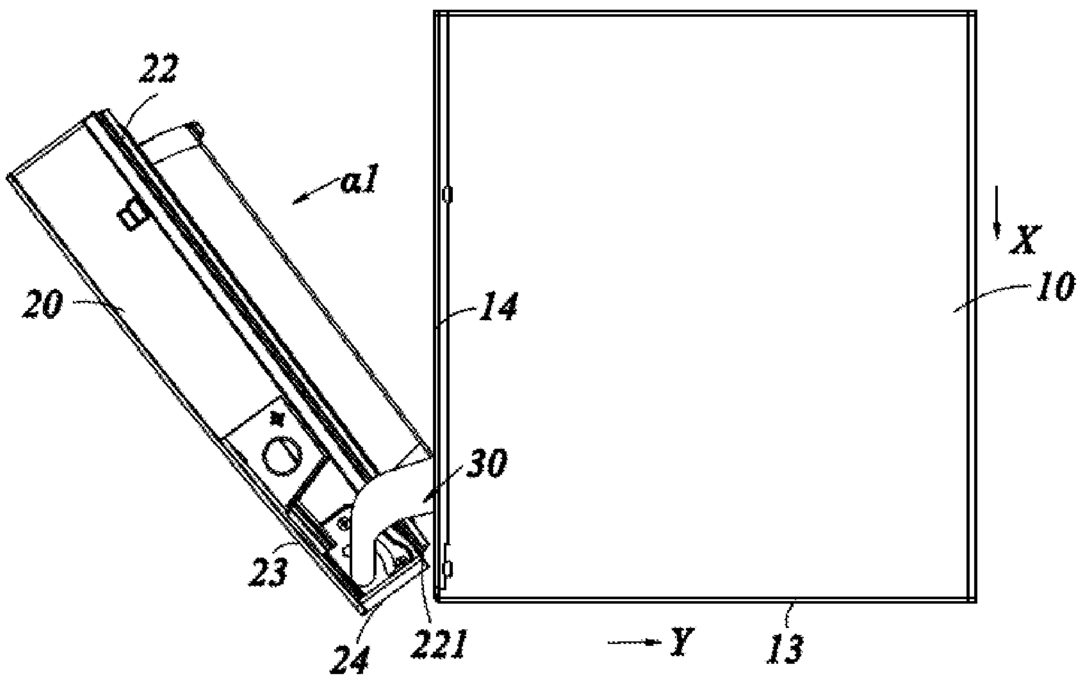
FIG. 8 is a top view of the refrigerator in the first specific example of the first embodiment opened to a first opening angle.
Figure 9:
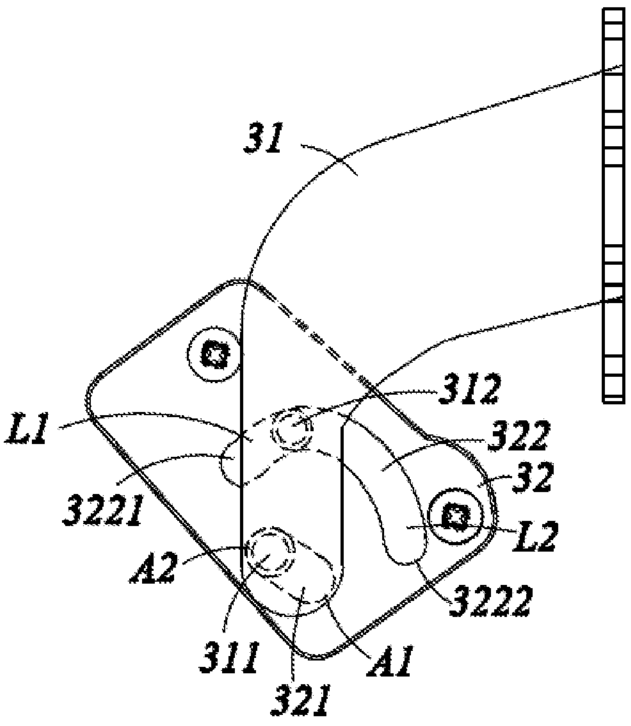
FIG. 9 is a perspective view of the hinge assembly in FIG. 8.

Referring to FIGS. 8 and 9, when the door 20 is opened from the closed state to a first opening angle $\alpha$1, the second shaft 312 moves in the first section L1 to drive the first shaft 311 to move from the initial position A1 to the pivot position A2, the door 20 moves away from the cabinet 10 in the first direction X, and meanwhile, the door gravity center moves towards the cabinet 10.

In a prior art, since a single-shaft hinge assembly is adopted, the door always rotates in situ relative to the cabinet, and the cabinet has a limited opening degree; in the present specific example, the door 20 moves away from the accommodating chamber S through cooperation of the double shafts (the first shaft 311 and the second shaft 312) and the double grooves (the first groove 321 and the second groove 322), thus effectively solving the opening degree problem of the cabinet 10.

In addition, it should be noted that, at the moment when the door 20 is opened, the hinge assembly 30 drives the door 20 to move away from the accommodating chamber S, thus effectively increasing the opening degree of the cabinet 10; meanwhile, the hinge assembly 30 drives the door gravity center to move towards the cabinet 10, thereby preventing the refrigerator 100 from toppling and falling.

Figure 10:
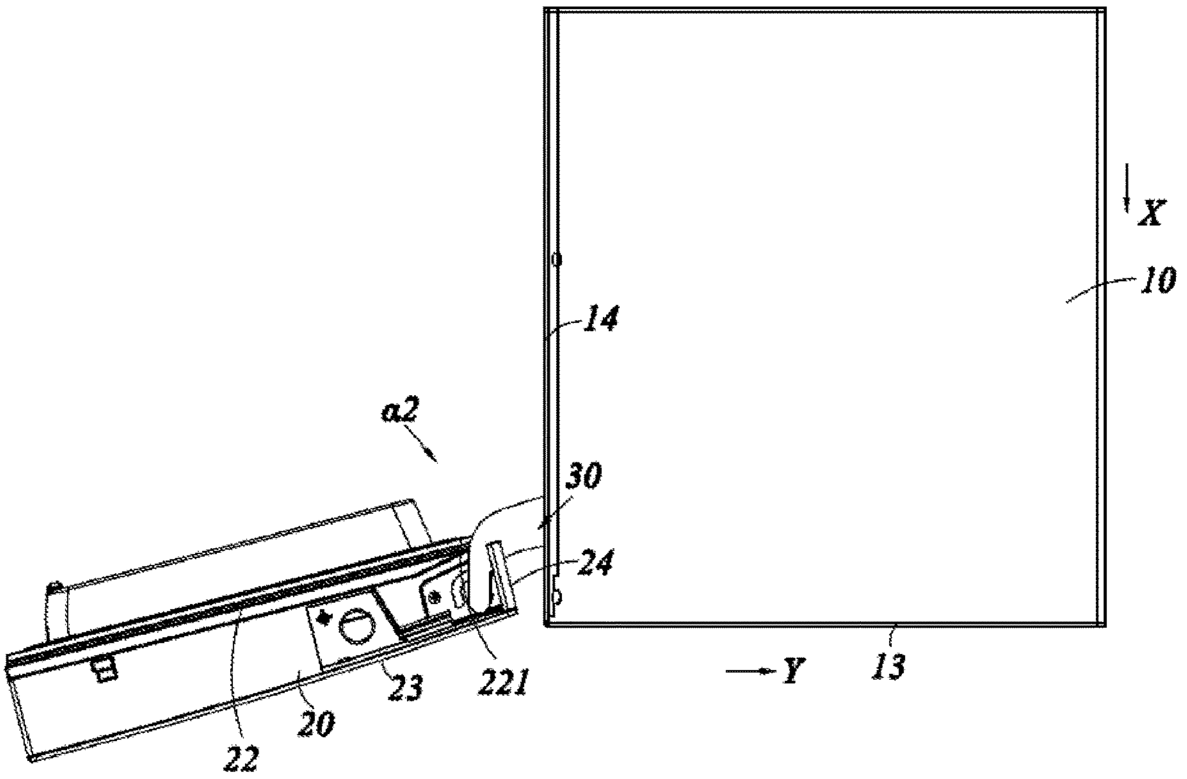
FIG. 10 is a top view of the refrigerator in the first specific example of the first embodiment opened to a second opening angle.
Figure 11:
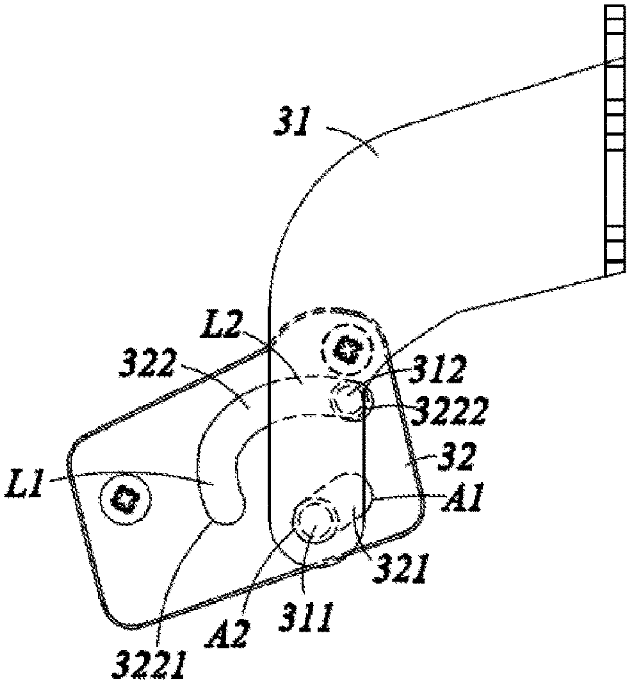
FIG. 11 is a perspective view of the hinge assembly in FIG. 10.

With reference to FIGS. 10 and 11, when the door 20 is continuously opened from the first opening angle $\alpha$1 to a maximum opening angle $\alpha$2, the first shaft 311 is kept at the pivot position A2, and the second shaft 312 moves in the second section L2 around the first shaft 311.

Here, the maximum opening angle $\alpha$2 is greater than 90°.

It should be noted that the refrigerator 100 in the present example may be configured as a single-door refrigerator, or the like.

In the present specific example, the door 20 includes a front wall 23 apart from the cabinet 10 and a side wall 24 always interposed between the front wall 23 and the cabinet 10.

Here, a front surface of the door 20 serves as the front wall 23, and a side surface of the door 20 serves as the side wall 24.

A distance between the initial position A1 and the front wall 23 is greater than a distance between the pivot position A2 and the front wall 23, and a distance between the initial position A1 and the side wall 24 is less than a distance between the pivot position A2 and the side wall 24.

Specifically, a distance between a center of the first shaft 311 at the initial position A1 and the front wall 23 is greater than a distance between a center of the first shaft 311 at the pivot position A2 and the front wall 23.

A distance between the center of the first shaft 311 at the initial position A1 and the side wall 24 is less than a distance between the center of the first shaft 311 at the pivot position A2 and the side wall 24.

A first distance is formed between the center of the first shaft 311 and the front wall 23, a second distance is formed between the center of the first shaft 311 and the side wall 24, and the first distance and the second distance are changed in the opening process of the door 20.

When the door 20 is opened from the closed state to the first opening angle $\alpha$1, the first distance decreases, and the second distance increases, and when the door 20 is continuously opened from the first opening angle $\alpha$1 to the maximum opening angle $\alpha$2, both the first distance and the second distance are kept unchanged.

Second Specific Example

FIGS. 12 to 19 are schematic diagrams of the second specific example, and similar structures are numbered similarly for ease of understanding.

In the second specific example, the first groove 321' includes an initial position A1' and a pivot position A2', and the second groove 322' includes a first end 3221', a second end 3222', a first section L1', a second section L2' and a third section L3', the first end 3221' and the second end 3222' being provided oppositely, and the first section L1', the second section L2' and the third section L3' being located between the first end 3221' and the second end 3222' and connected.

Figure 12:
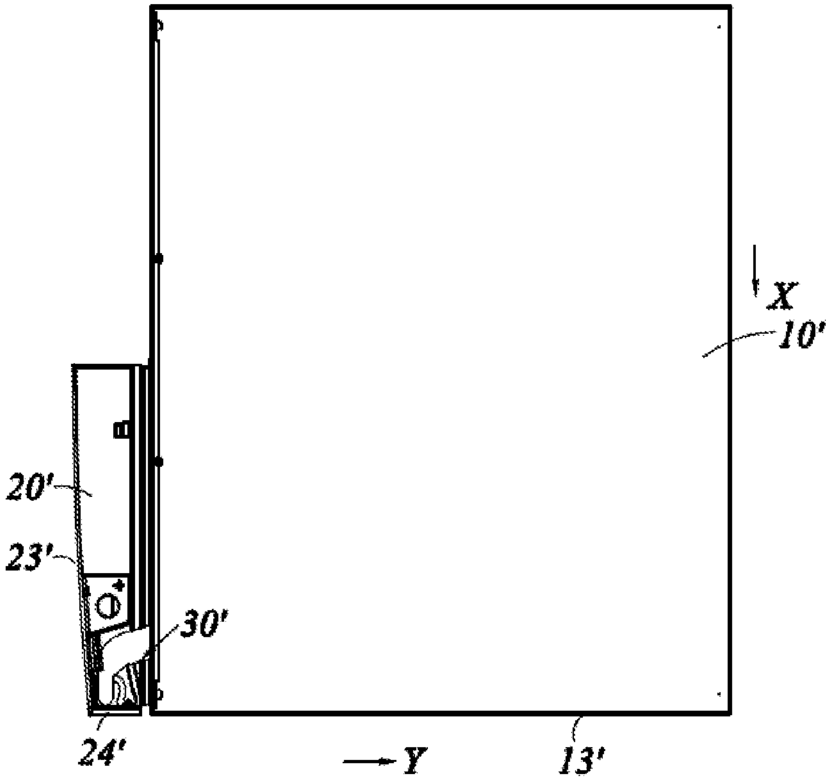
FIG. 12 is a top view of the refrigerator in a second specific example of the first embodiment in the closed state.
Figure 13:
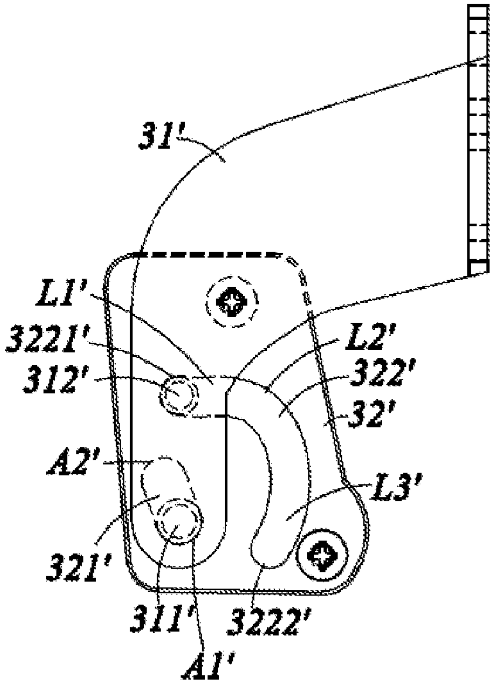
FIG. 13 is a perspective view of the hinge assembly in FIG. 12.

Referring to FIGS. 12 and 13, when the door 20' is in the closed state, the first shaft 311' is located at the initial position A1', and the second shaft 312' is located at the first end 3221'.

Figure 14:
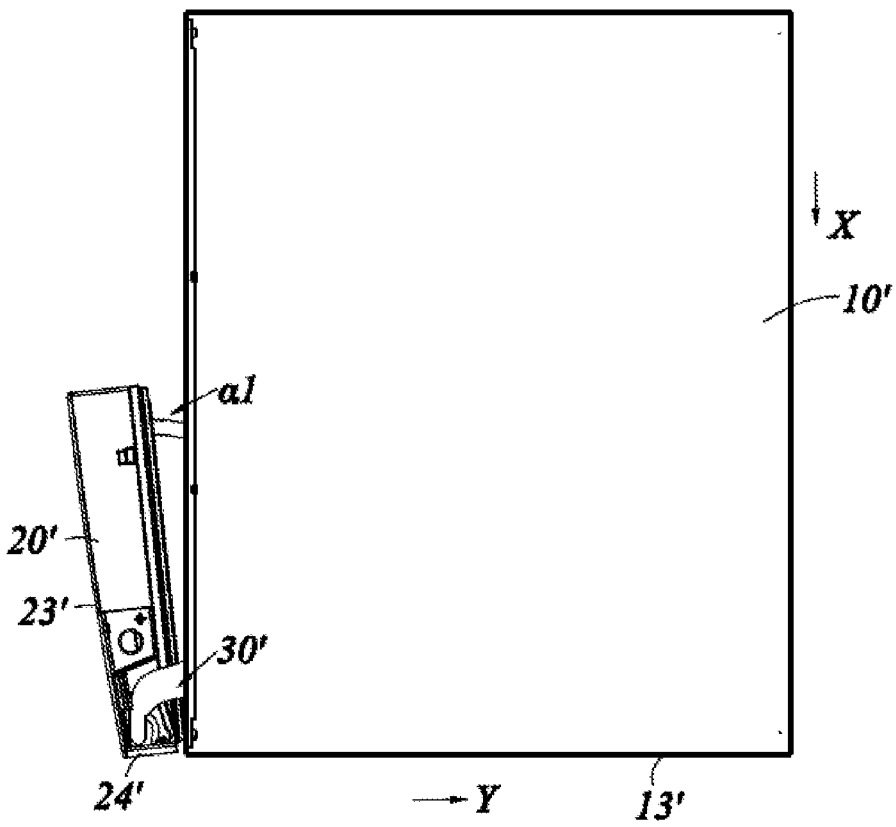
FIG. 14 is a top view of the refrigerator in the second specific example of the first embodiment opened to the first opening angle.
Figure 15:
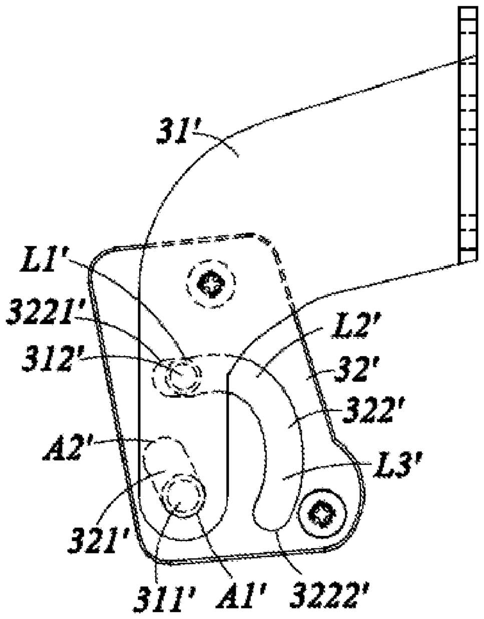
FIG. 15 is a perspective view of the hinge assembly in FIG. 14.

Referring to FIGS. 14 and 15, when the door 20' is opened from the closed state to the first opening angle α1, the first shaft 311' is kept at the initial position A1', and the second shaft 312' moves in the first section L1' around the first shaft 311'.

Figure 16:
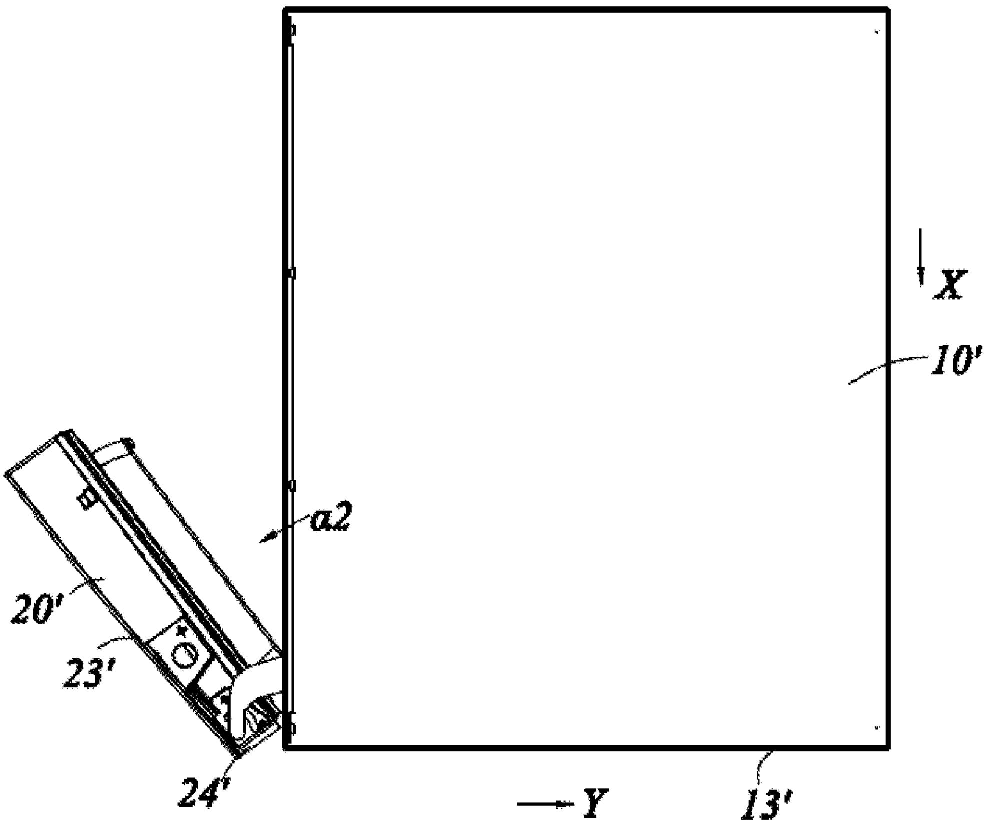
FIG. 16 is a top view of the refrigerator in the second specific example of the first embodiment opened to the second opening angle.
Figure 17:
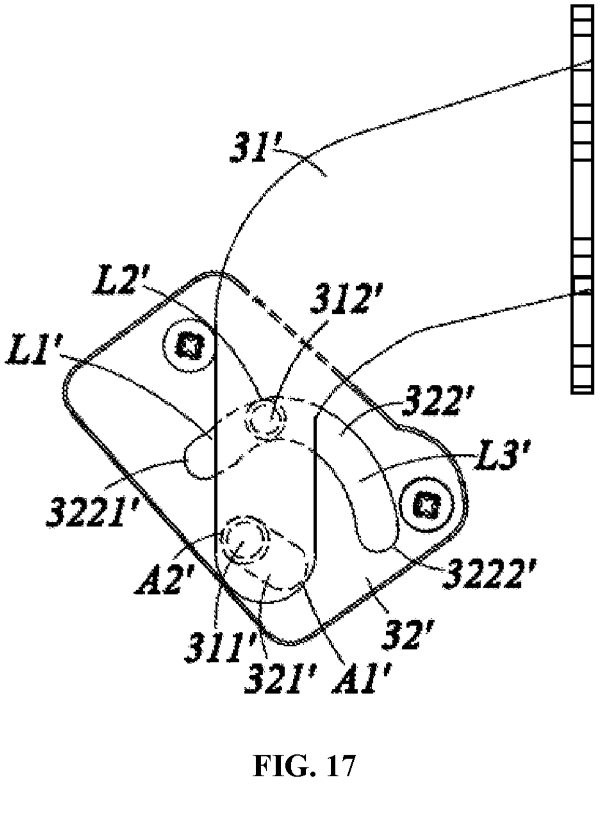
FIG. 17 is a perspective view of the hinge assembly in FIG. 16.

Referring to FIGS. 16 and 17, when the door 20' is continuously opened from the first opening angle α1 to a second opening angle α2, the second shaft 312' moves in the second section L2' to drive the first shaft 311' to move from the initial position A1' to the pivot position A2', the door 20' moves away from the cabinet 10' in the first direction X, and meanwhile, the door gravity center moves towards the cabinet 10'.

Figure 18:
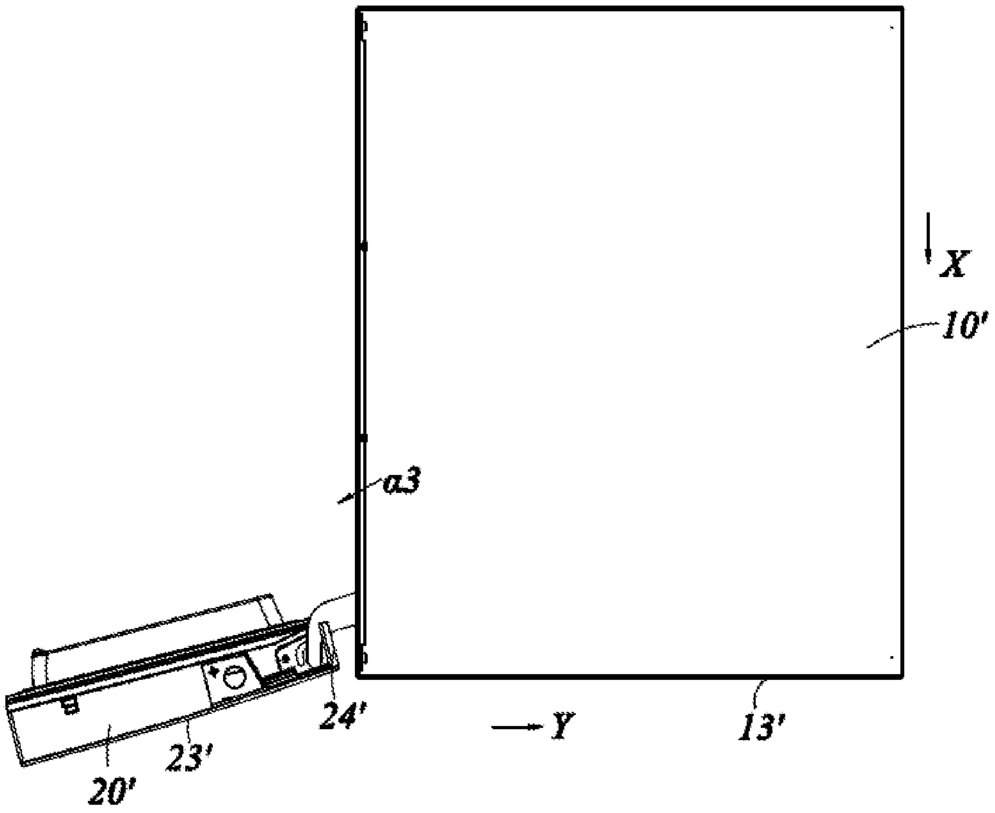
FIG. 18 is a top view of the refrigerator in the second specific example of the first embodiment opened to a third opening angle.
Figure 19:
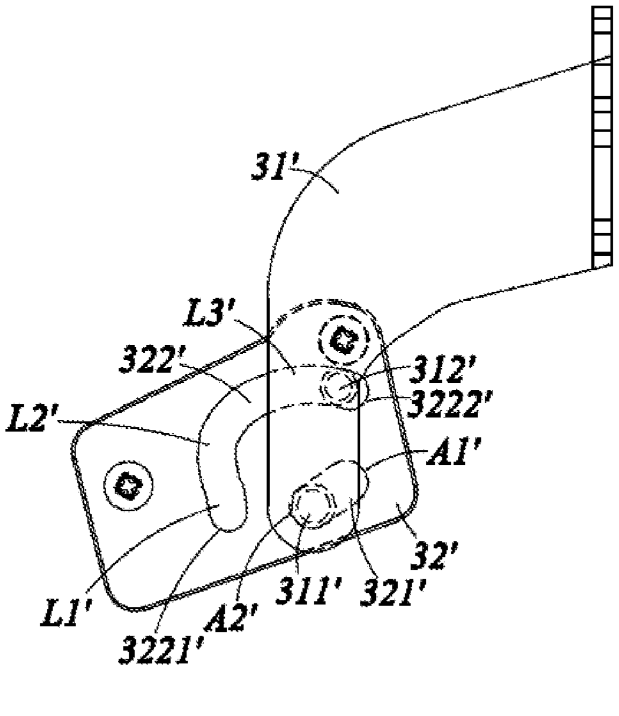
FIG. 19 is a perspective view of the hinge assembly in FIG. 18.

With reference to FIGS. 18 and 19, when the door 20' is continuously opened from the second opening angle α2 to a maximum opening angle α3, the first shaft 311' is kept at the pivot position A2', and the second shaft 312' moves in the third section L3' around the first shaft 311'.

Here, the maximum opening angle α3 is greater than 90°.

In the present specific example, the door 20' includes a front wall 23' apart from the cabinet 10' and a side wall 24' always interposed between the front wall 23' and the cabinet 10'.

Here, a front surface of the door 20' serves as the front wall 23', and a side surface of the door 20' serves as the side wall 24'.

A distance between the initial position A1' and the front wall 23' is greater than a distance between the pivot position A2' and the front wall 23', and a distance between the initial position A1' and the side wall 24' is less than a distance between the pivot position A2' and the side wall 24'.

Specifically, a distance between a center of the first shaft 311' at the initial position A1' and the front wall 23' is greater than a distance between a center of the first shaft 311' at the pivot position A2' and the front wall 23'.

A distance between the center of the first shaft 311' at the initial position A1' and the side wall 24' is less than a distance between the center of the first shaft 311' at the pivot position A2' and the side wall 24'.

A first distance is formed between the center of the first shaft 311' and the front wall 23', a second distance is formed between the center of the first shaft 311' and the side wall 24', and the first distance and the second distance are changed in the opening process of the door 20'.

When the door 20' is opened from the closed state to the first opening angle α1, the first distance decreases, and the second distance increases, and when the door 20' is continuously opened from the first opening angle α1 to the maximum opening angle α2, both the first distance and the second distance are kept unchanged.

Third Specific Example

In the third specific example, in conjunction with the description of the second specific example and referring to FIGS. 20 to 23, the door 20' is further provided with a first fitting portion 25', and the cabinet 10' is further provided with a second fitting portion 15'.

Figure 20:
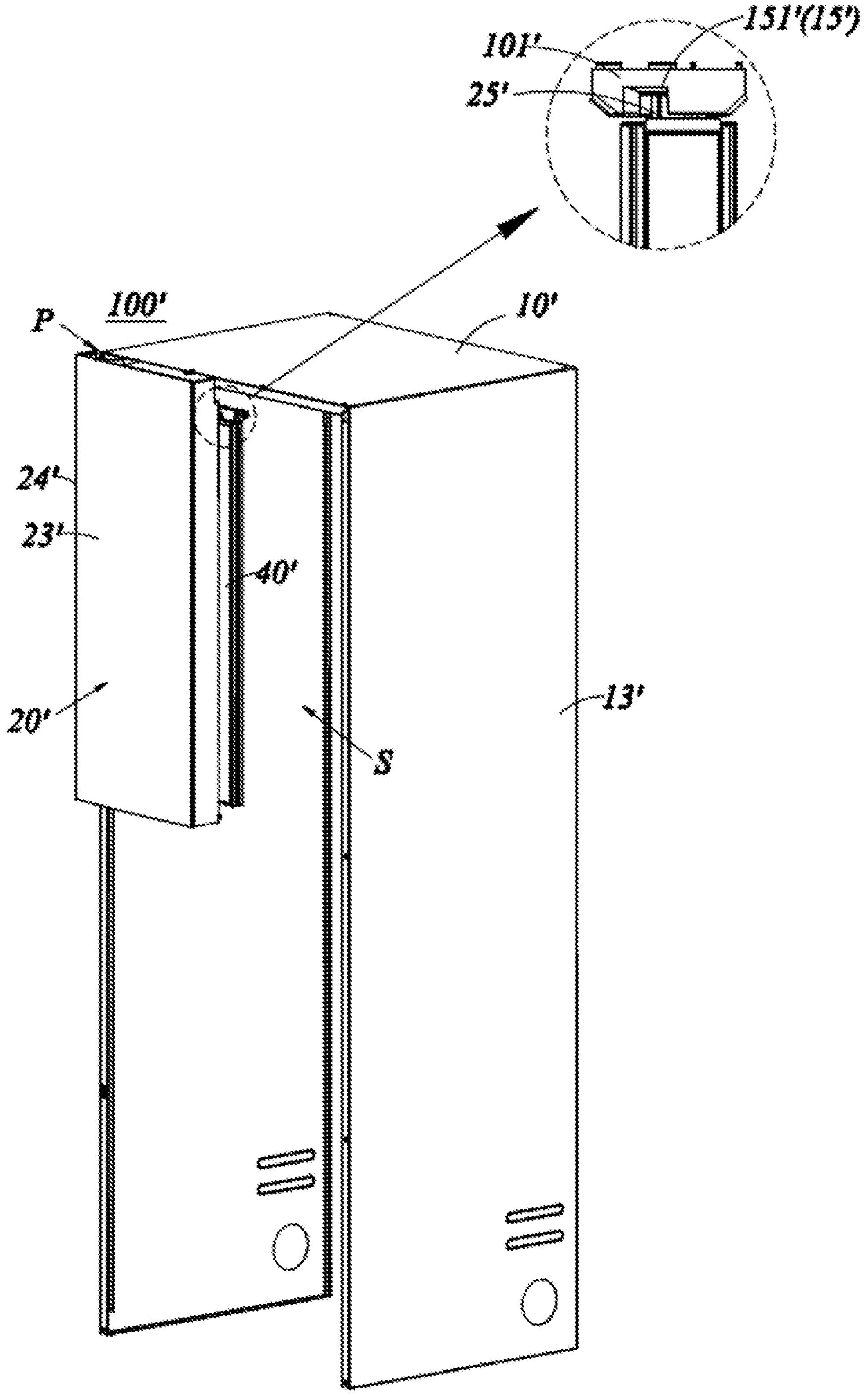
FIG. 20 is a perspective view of the refrigerator in a third specific example of the first embodiment in the closed state.

Referring to FIG. 20, when the door 20' is in the closed state, the first fitting portion 25' and the second fitting portion 15' are engaged with each other.

Here, the first fitting portion 25' and the second fitting portion 15' are engaged with each other to close the door 20' and the cabinet 10', and specific forms of the first fitting portion 25' and the second fitting portion 15' may be determined according to actual situations.

Figure 21:
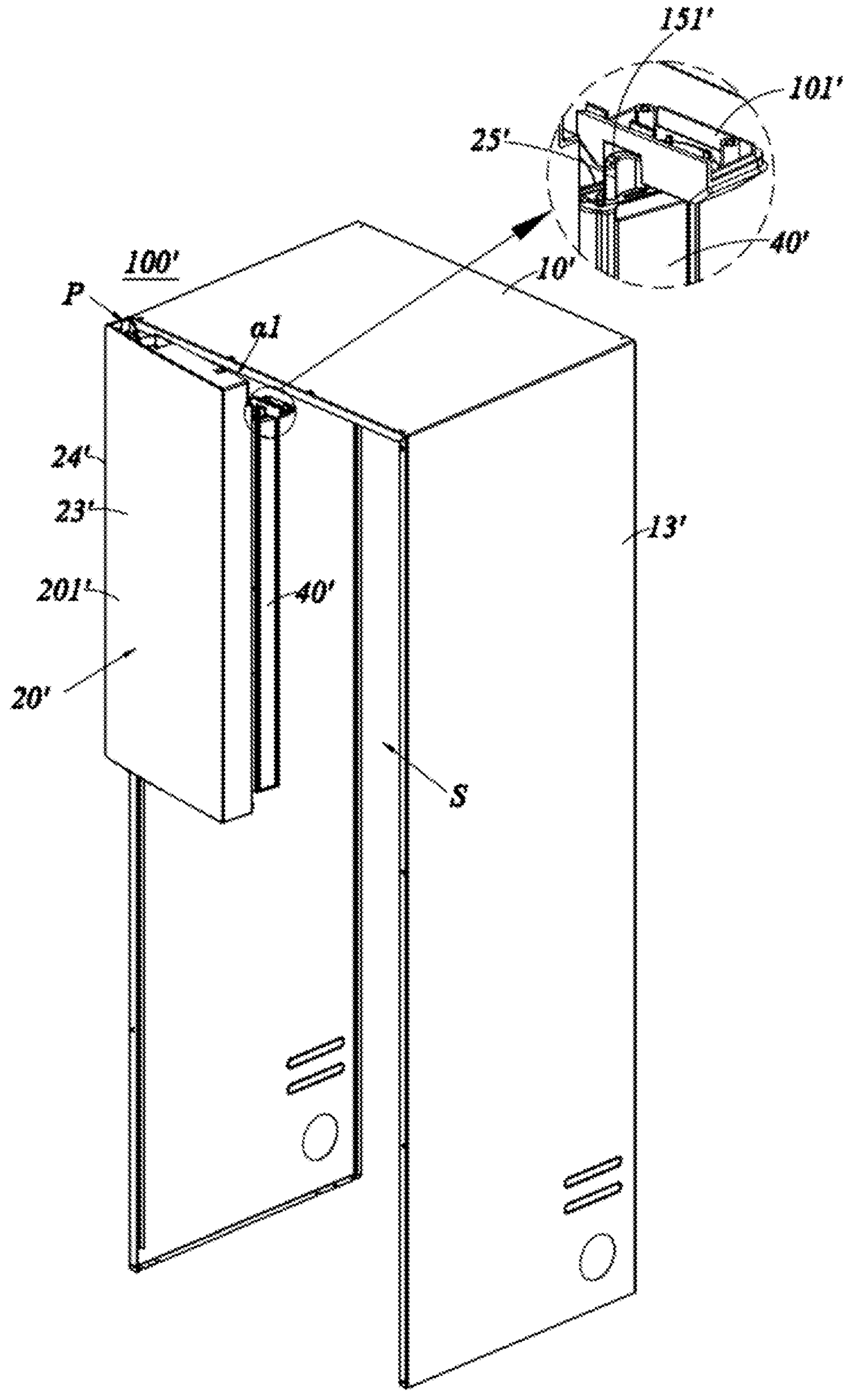
FIG. 21 is a perspective view of the refrigerator in the third specific example of the first embodiment opened to the first opening angle.

Referring to FIG. 21, when the door 20' is opened from the closed state to the first opening angle α1, the second shaft 312' moves in the first section L1' around the first shaft 311', so as to drive the first fitting portion 25' to be disengaged from the second fitting portion 15'.

Here, when opened to the first opening angle α1 from the closed state, the door 20' rotates in situ relative to the cabinet 10'; that is, the door 20' only rotates without generating displacement in other directions, thus effectively avoiding that the first fitting portion 25' is unable to be disengaged from the second fitting portion 15' due to the displacement in a certain direction of the door 20'.

Figure 22:
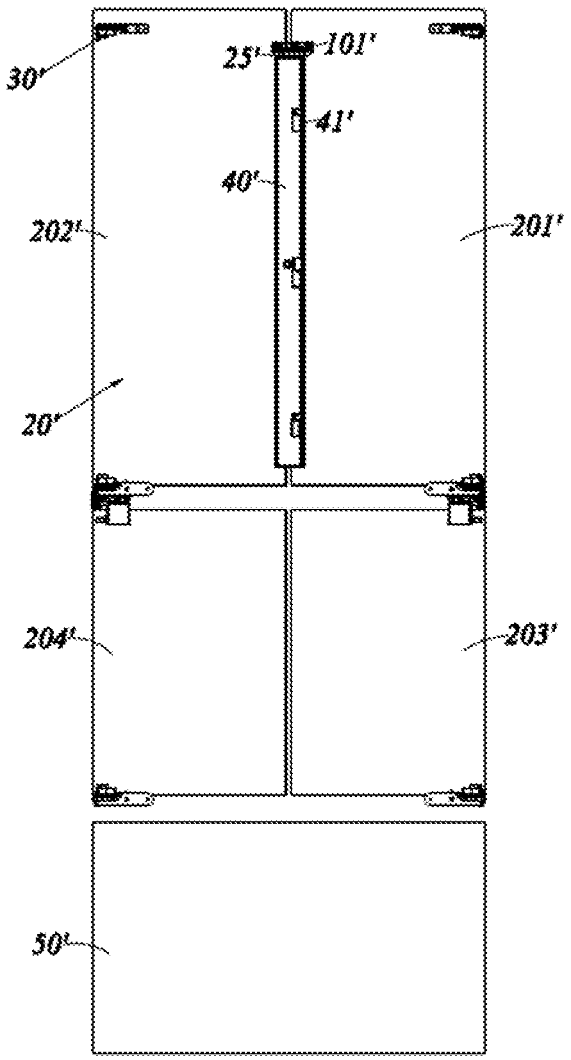
FIG. 22 is a rear view of the refrigerator in the third specific example of the first embodiment (with some elements omitted)
Figure 23:
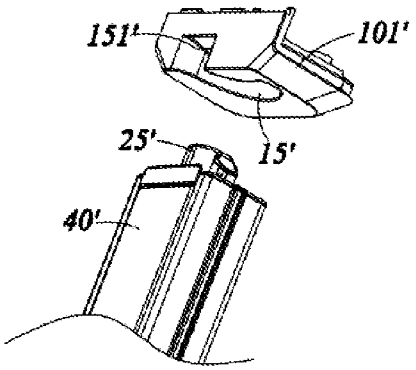
FIG. 23 is an exploded view of a first fitting portion and a second fitting portion in the third specific example according to the first embodiment.

Referring to FIGS. 22 and 23, in the present specific example, the door 20' includes a first door 201' and a second door 202' pivotally connected with the cabinet 10' and arranged side by side in a horizontal direction.

The refrigerator 100' further includes a vertical beam 40' movably connected to a side of the first door 201' close to the second door 202', and the first fitting portion 25' is provided at the vertical beam 40'.

Here, the vertical beam 40' is movably connected to a right side of the first door 201', the vertical beam 40' and the first door 201' may be connected by a return spring 41', and the vertical beam 40' rotates relative to the first door 201' around an axis in a vertical direction; in other words, under the action of the return spring 41', the vertical beam 40' may rotate relative to the first door 201' and be kept at a predetermined position.

The first fitting portion 25' is configured as a bump 25' protruding upwards from the vertical beam 40'.

The second fitting portion 15' is fixedly provided on the cabinet 10'; for example, the second fitting portion 15' is configured as a groove 15' in a base 101', the base 101' is fixedly provided at a top of the cabinet 10', a notch 151' is provided in an end of the groove 15', the notch 151' has a forward opening, the bump 25' and the groove 15' are both arc-shaped, and the bump 25' enters or leaves the groove 15' through the notch 151' to achieve mutual limitation and separation of the bump 25' and the groove 15'.

Certainly, it may be understood that specific structures of the first and second fitting portions 25', 15' are not limited to the above description; that is, the first fitting portion 25' is not limited to the bump 25' at the vertical beam 40', the second fitting portion 15' is not limited to the groove 15' fitted with the bump 25', and the first and second fitting portions 25', 15' may be configured as structures fitted with each other in other regions of the refrigerator 100'.

In the present example, the door 20' further includes a third door 203' and a fourth door 204' pivotally connected to the cabinet 10' and arranged side by side in the horizontal direction, the third door 203' is located below the first door 201', the fourth door 204' is located below the second door 202', and the refrigerator 100' further includes a drawer 50' located below the third door 203' and the fourth door 204'.

Here, the chamber corresponding to the first door 201' and the second door 202' is configured as a refrigerating chamber; that is, the refrigerating chamber has a side-by-side structure; the third door 203' and the fourth door 204' correspond to two independent variable temperature compartments respectively; the drawer 50' is configured as a freezing drawer.

It should be noted that the refrigerator 100' includes a fixed beam fixed inside the cabinet 10' and configured to separate the two variable temperature compartments, and the third door 203' and the fourth door 204' may be fitted with the fixed beam to achieve a sealing effect; that is, at this point, no vertical beam is required to be provided at the third door 203' and the fourth door 204'.

The refrigerator 100' in the present specific example may be a single-door refrigerator having the first fitting portion 25' and the second fitting portion 15', or a side-by-side refrigerator, a multi-door refrigerator, or the like, having the first fitting portion 25' and the second fitting portion 15'.

Figure 24:
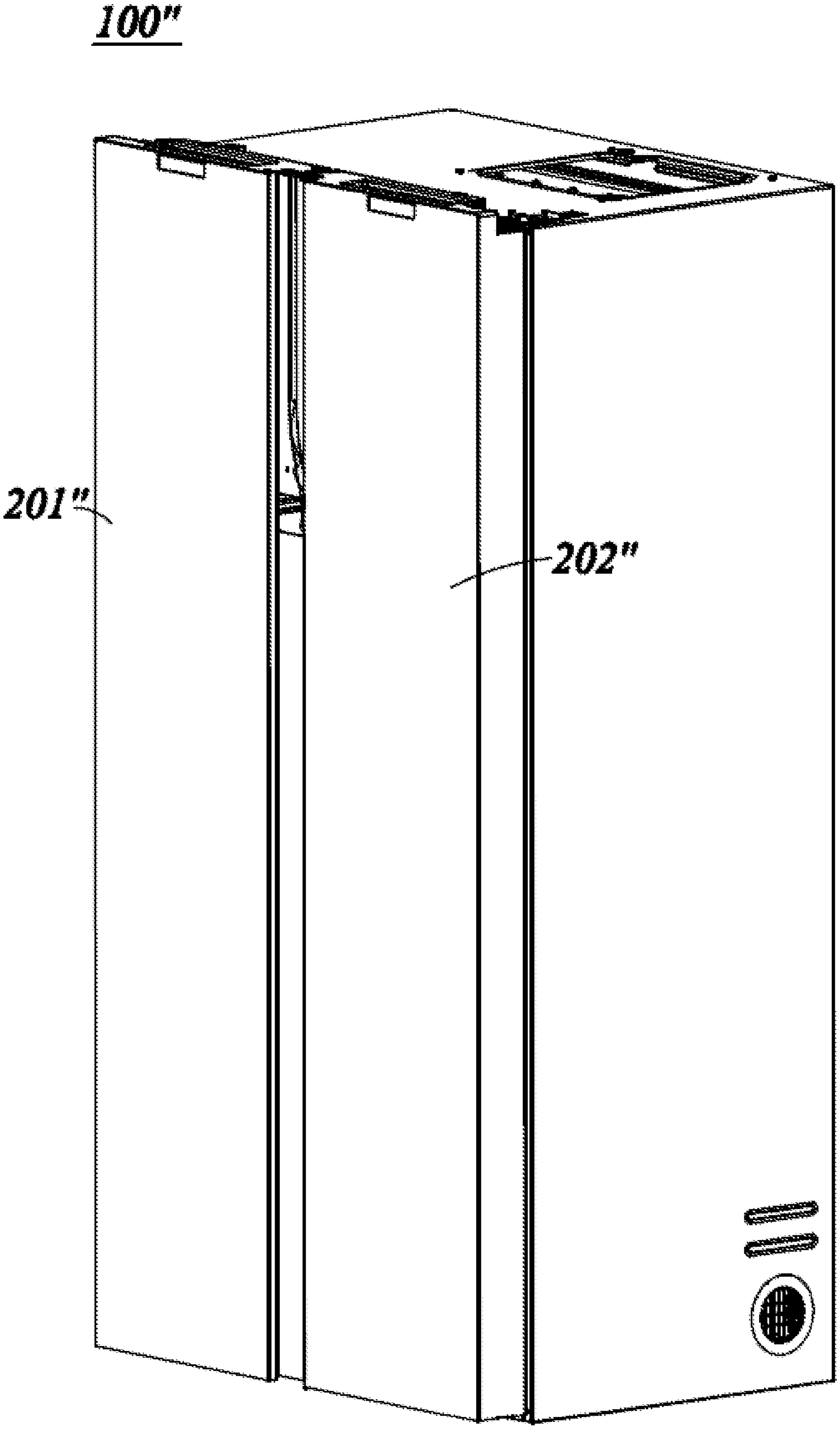
FIG. 24 is an overall schematic diagram of the refrigerator in another specific example of the present invention.
Figure 25:
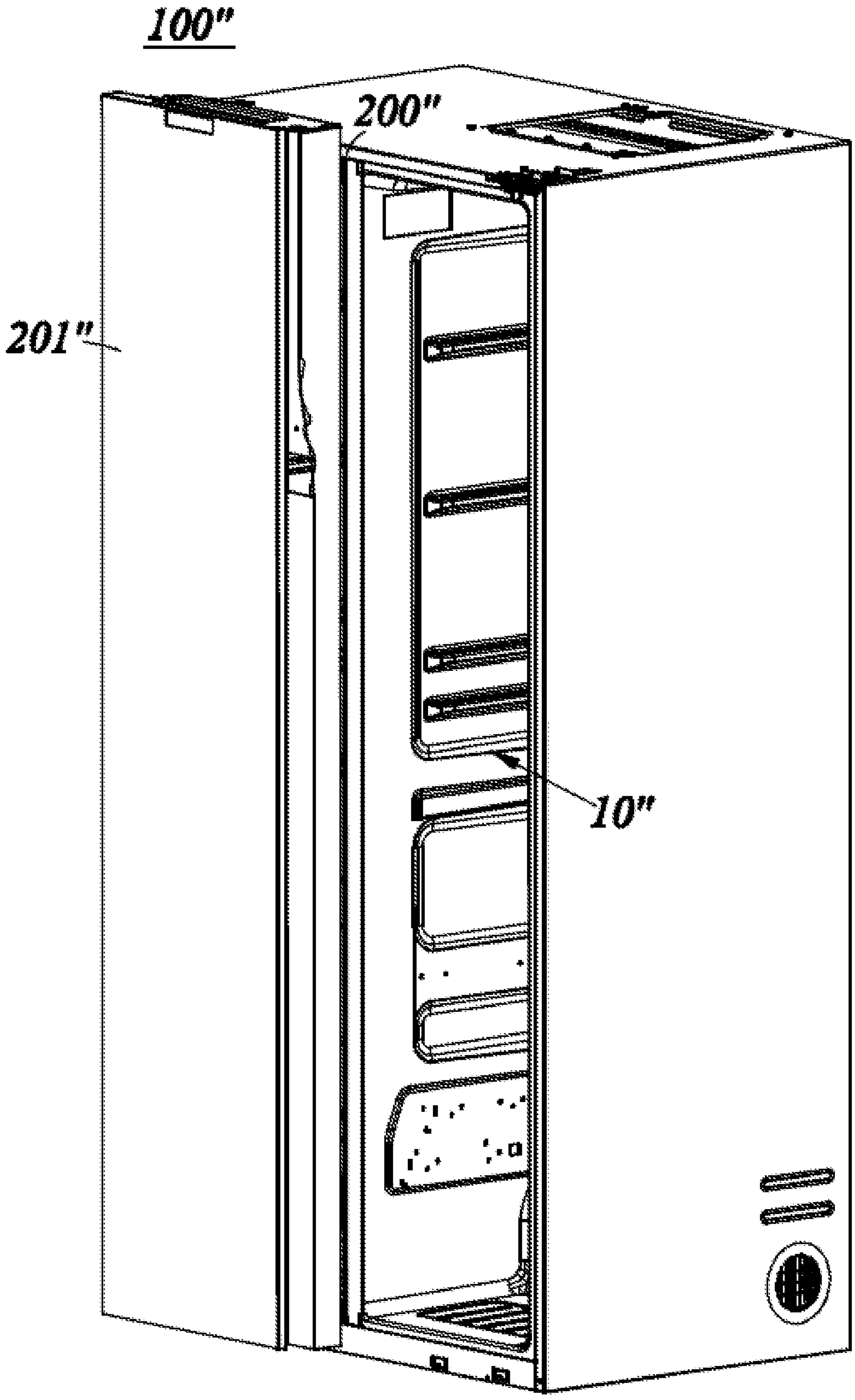
FIG. 25 is a schematic diagram of the refrigerator in another specific example of the present invention with a part omitted.
Figure 26:
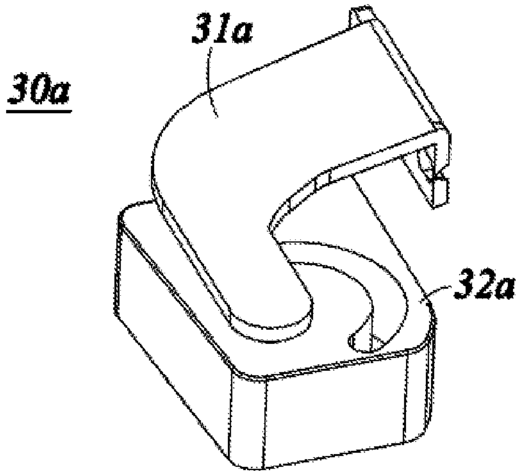
FIG. 26 is a schematic diagram of a hinge assembly in a second embodiment of the present invention.
Figure 27:
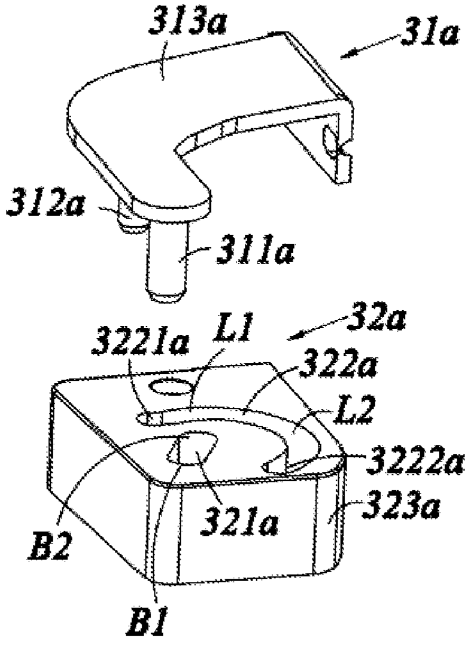
FIG. 27 is an exploded view of the hinge assembly in the second embodiment of the present invention.

In other specific examples, the refrigerator 100' may not include the first fitting portion 25' and the second fitting portion 15'; with reference to FIGS. 24 and 25, the refrigerator is configured as a side-by-side refrigerator 100", the refrigerator 100" includes two compartments distributed at intervals, and the two compartments are spaced apart from each other by a fixed beam 200"; the refrigerator 100" further includes a first door 201" and a second door 202" corresponding to the two compartments respectively, and the first door 201" and the second door 202" are provided adjacent to each other; when the refrigerator 100" is in a closed state, both the first door 201" and the second door 202" contact the fixed beam 200" to achieve a sealing effect, and when the first door 201" and/or the second door 202" are/is opened from the closed state to the first opening angle α1, the first door 201" and/or the second door 202" rotate(s) in situ relative to the cabinet 10".

Here, when the first door 201" is displaced horizontally when opened, the first door 201" and the second door 202" are unable to be opened normally due to interference therebetween, but the first door 201" and the second door 202" rotate in situ when the refrigerator 100" in this example is opened, thus effectively avoiding the interference between the adjacent first and second doors 201", 202".

Certainly, the type of the refrigerator 100 is not limited to the above-mentioned specific examples, and may be determined according to actual situations.

With reference to FIGS. 26 to 41, in a second embodiment, a hinge assembly 30*a* includes a first shaft 311*a*, a first groove 321*a*, a second shaft 312*a* and a second groove 322*a*, the first shaft 311*a* and the first groove 321*a* are fitted with each other, the second shaft 312*a* and the second groove 322*a* are fitted with each other, the first shaft 311*a* and the second shaft 312*a* are located at a cabinet 10*a*, and the first groove 321*a* and the second groove 322*a* are located at a door 20*a*.

Specifically, the hinge assembly 30*a* includes a first hinge part 32*a* and a second hinge part 31*a* which are fitted with each other, the first hinge part 32*a* is located at the door 20*a*, and the second hinge part 31*a* is located at the cabinet 10*a*.

First Specific Example

In the first specific example, referring to FIGS. 26 to 33, the first groove 321*a* includes an initial position B1 and a pivot position B2, and the second groove 322*a* includes a first end 3221*a*, a second end 3222*a*, a first section M1 and a second section M2, the first end 3221*a* and the second end 3222*a* being provided oppositely, and the first section M1 and the second section M2 being located between the first end 3221*a* and the second end 3222*a* and connected with each other.

Figure 28:
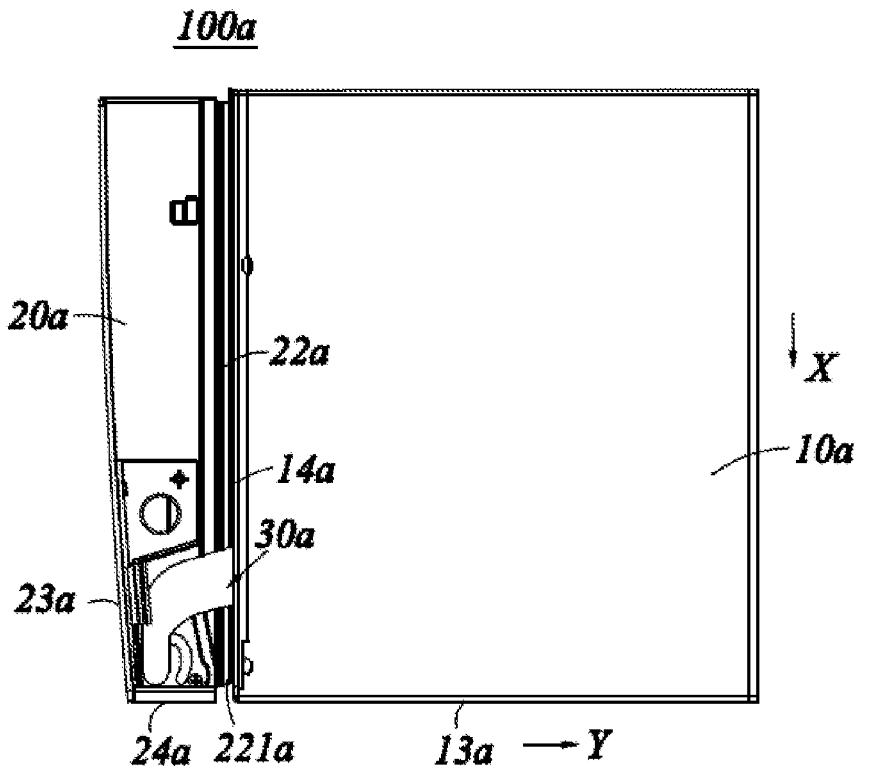
FIG. 28 is a top view of a refrigerator in a first specific example of the second embodiment in a closed state.
Figure 29:
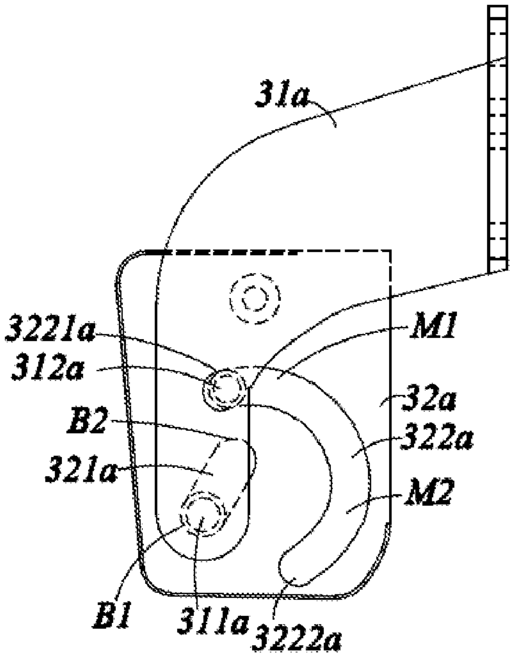
FIG. 29 is a perspective view of the hinge assembly in FIG. 28.

Referring to FIGS. 28 and 29, when the door 20*a* is in a closed state, the first shaft 311*a* is located at the initial position B1, and the second shaft 312*a* is located at the first end 3221*a*.

Figure 30:
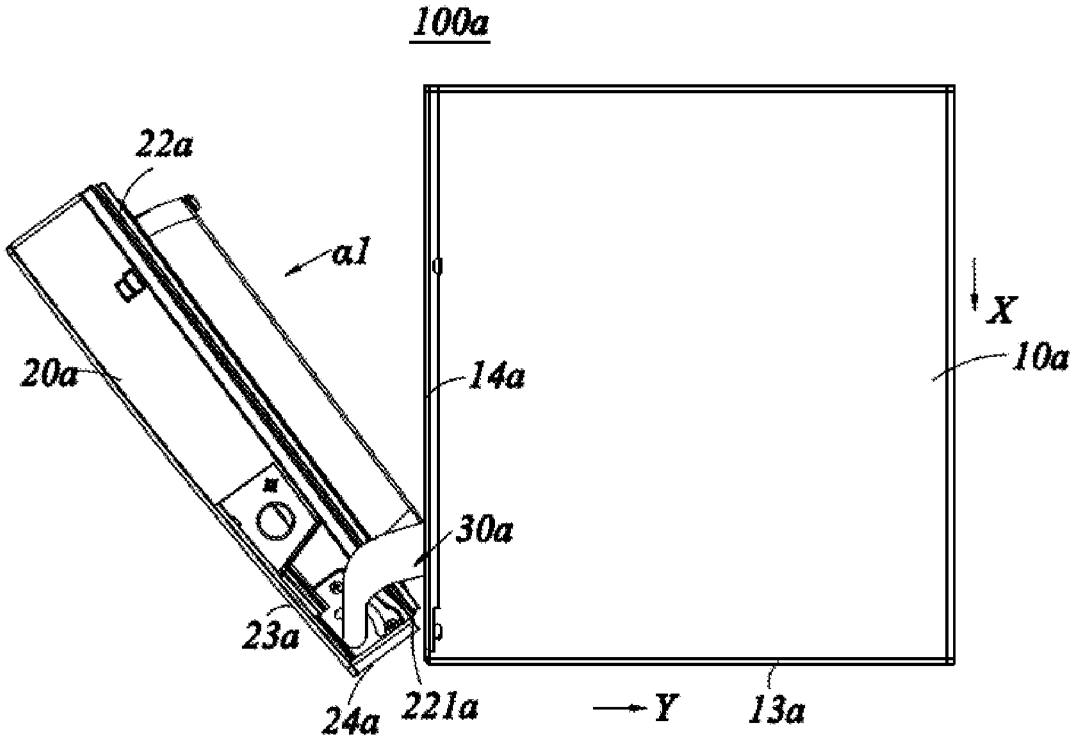
FIG. 30 is a top view of the refrigerator in the first specific example of the second embodiment opened to a first opening angle.
Figure 31:
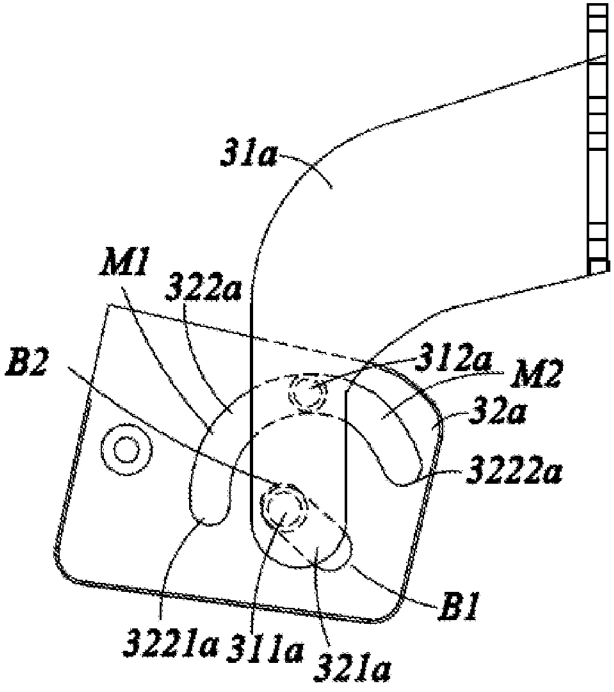
FIG. 31 is a perspective view of the hinge assembly in FIG. 30.

Referring to FIGS. 30 and 31, when the door 20*a* is opened from the closed state to a first opening angle α1, the second shaft 312*a* moves in the first section M1 to drive the first shaft 311*a* to move from the initial position B1 to the pivot position B2, the door 20*a* moves away from the cabinet 10*a* in the first direction X, and meanwhile, the door gravity center moves towards the cabinet 10*a*.

In a prior art, since a single-shaft hinge assembly is adopted, the door always rotates in situ relative to the cabinet, and the cabinet has a limited opening degree; in the present specific example, the door 20*a* moves away from the accommodating chamber through cooperation of the double shafts (the first shaft 311*a* and the second shaft 312*a*) and the double grooves (the first groove 321*a* and the second groove 322*a*), thus effectively solving the opening degree problem of the cabinet 10*a*.

In addition, it should be noted that, at the moment when the door 20*a* is opened, the hinge assembly 30*a* drives the door 20*a* to move away from the accommodating chamber, thus effectively increasing the opening degree of the cabinet 10*a*; meanwhile, the hinge assembly 30*a* drives the door gravity center to move towards the cabinet 10*a*, thereby preventing a refrigerator 100*a* from toppling and falling.

Figure 32:
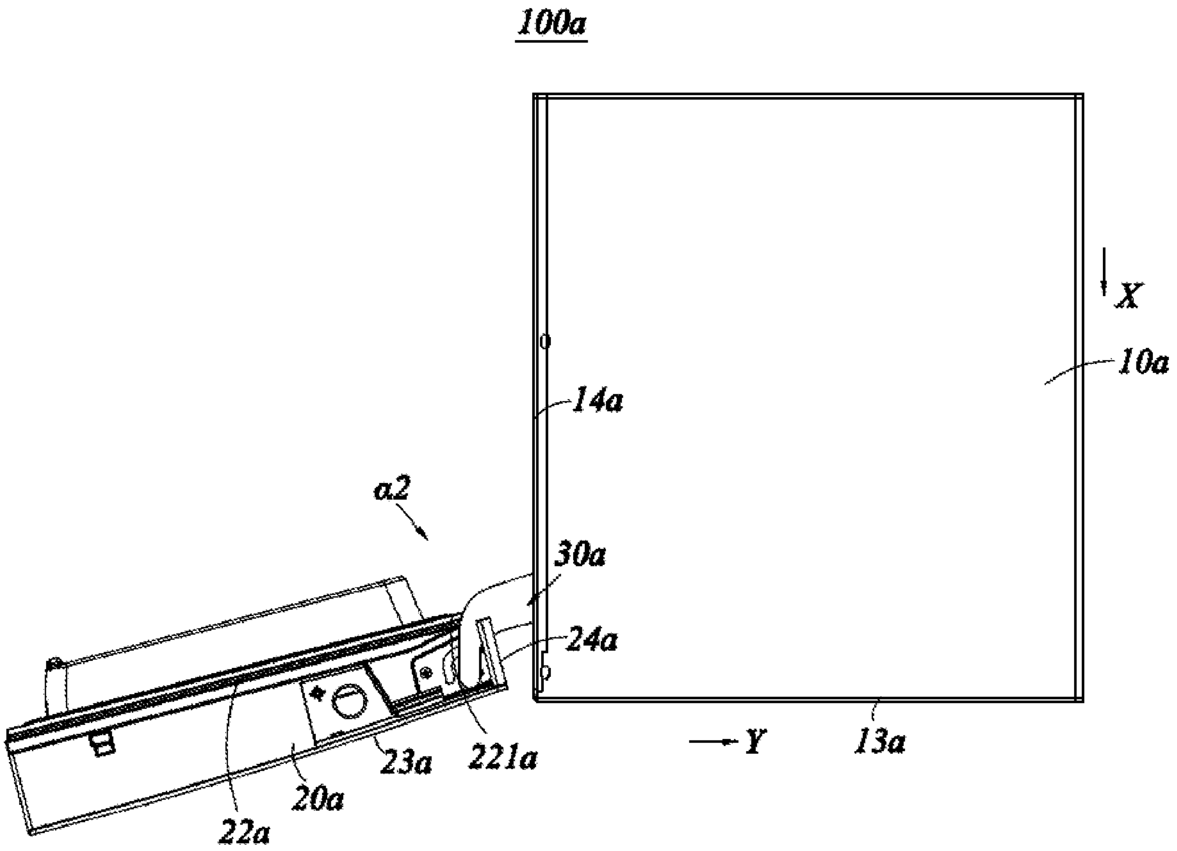
FIG. 32 is a top view of the refrigerator in the first specific example of the second embodiment opened to a second opening angle.
Figure 33:
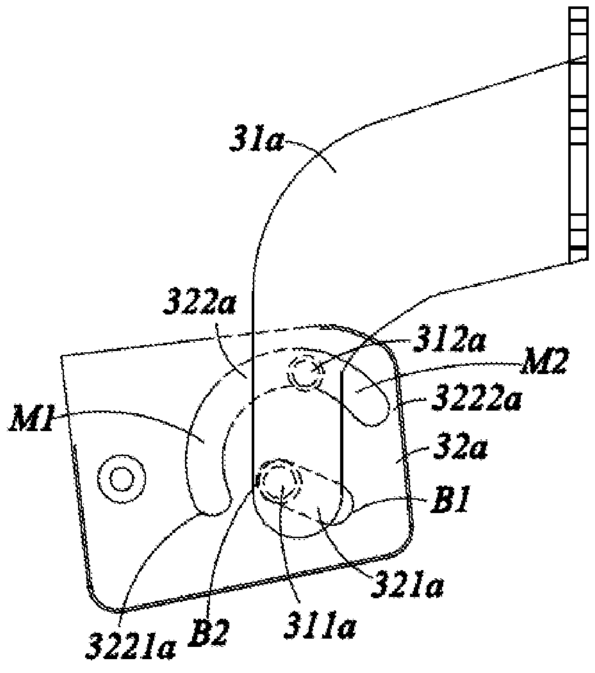
FIG. 33 is a perspective view of the hinge assembly in FIG. 32.

With reference to FIGS. 32 and 33, when the door 20*a* is continuously opened from the first opening angle α1 to a maximum opening angle α2, the first shaft 311*a* is kept at the pivot position B2, and the second shaft 312*a* moves in the second section M2 around the first shaft 311*a*.

Here, the maximum opening angle α2 is greater than 90°.

It should be noted that the refrigerator 100*a* in the present example may be configured as a single-door refrigerator, or the like.

In the present specific example, the door 20*a* includes a front wall 23*a* apart from the cabinet 10*a* and a side wall 24*a* always interposed between the front wall 23*a* and the cabinet 10*a*.

Here, a front surface of the door 20*a* serves as the front wall 23*a*, and a side surface of the door 20*a* serves as the side wall 24*a*.

A distance between the initial position B1 and the front wall 23*a* is less than a distance between the pivot position B2 and the front wall 23*a*, and a distance between the initial position B1 and the side wall 24*a* is less than a distance between the pivot position B2 and the side wall 24*a*.

Specifically, a distance between a center of the first shaft 311*a* at the initial position B1 and the front wall 23*a* is less than a distance between a center of the first shaft 311*a* at the pivot position B2 and the front wall 23*a*.

A distance between the center of the first shaft 311*a* at the initial position B1 and the side wall 24*a* is less than a distance between the center of the first shaft 311*a* at the pivot position B2 and the side wall 24*a*.

A first distance is formed between the center of the first shaft 311*a* and the front wall 23*a*, a second distance is formed between the center of the first shaft 311*a* and the side wall 24*a*, and the first distance and the second distance are changed in the opening process of the door 20*a*.

When the door 20*a* is opened from the closed state to the first opening angle α1, the first distance increases, and the second distance increases, and when the door 20*a* is continuously opened from the first opening angle α1 to the maximum opening angle α2, both the first distance and the second distance are kept unchanged.

Second Specific Example

FIGS. 34 to 41 are schematic diagrams of the second specific example, and similar structures are numbered similarly for ease of understanding.

In the second specific example, the first groove 321*a*' includes an initial position B1' and a pivot position B2', and the second groove 322*a*' includes a first end 3221*a*', a second end 3222*a*', a first section M1', a second section M2' and a third section M3', the first end 3221*a*' and the second end 3222*a*' being provided oppositely, and the first section M1', the second section M2' and the third section M3' being located between the first end 3221*a*' and the second end 3222*a*' and connected.

Figure 34:
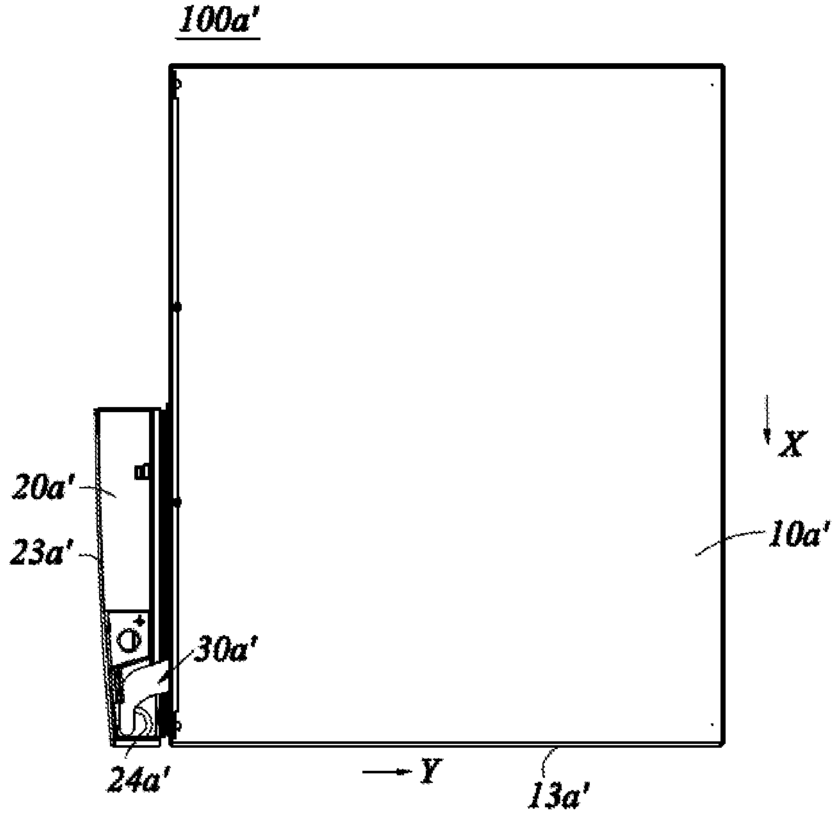
FIG. 34 is a top view of the refrigerator in a second specific example of the second embodiment in the closed state.
Figure 35:
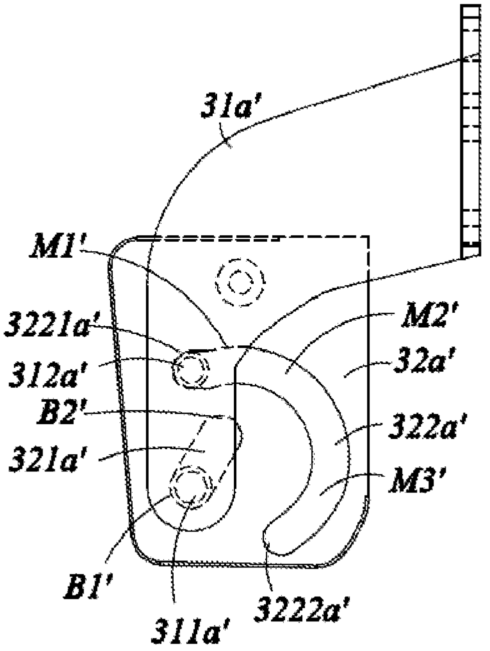
FIG. 35 is a perspective view of the hinge assembly in FIG. 34.

Referring to FIGS. 34 and 35, when the door 20*a*' is in the closed state, the first shaft 311*a*' is located at the initial position B1', and the second shaft 312*a*' is located at the first end 3221*a'*.

Figure 36:
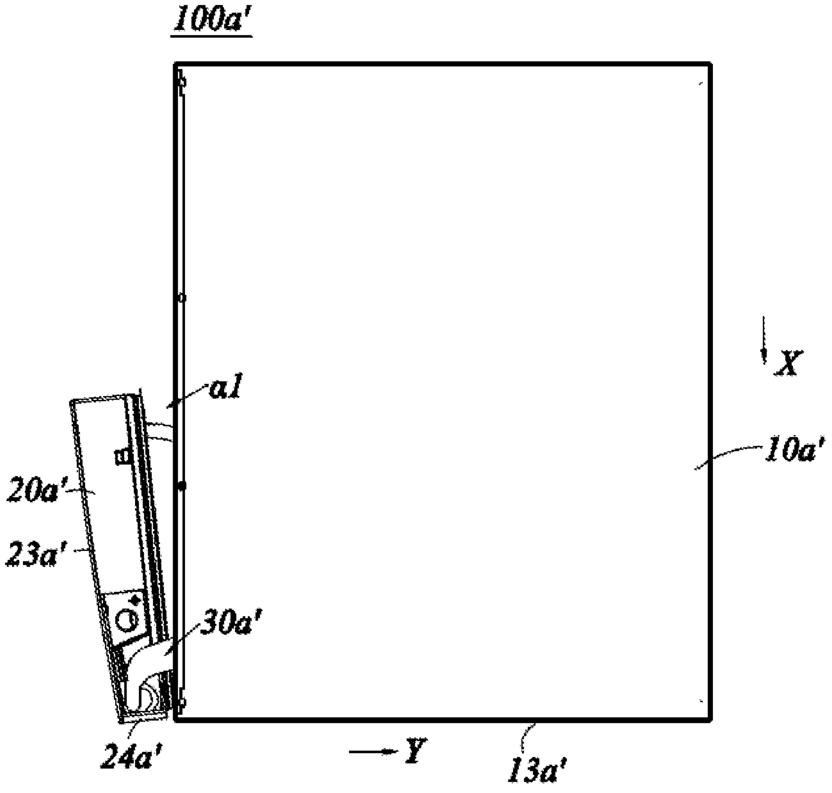
FIG. 36 is a top view of the refrigerator in the second specific example of the second embodiment opened to the first opening angle.
Figure 37:
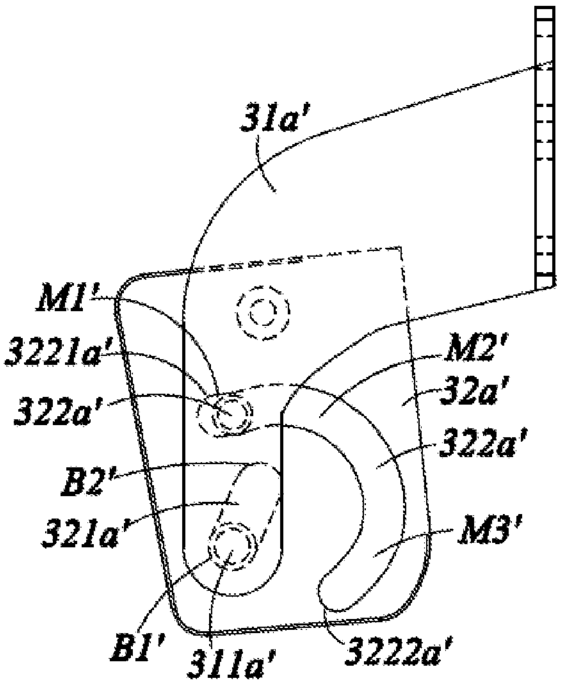
FIG. 37 is a perspective view of the hinge assembly in FIG. 36.

Referring to FIGS. 36 and 37, when the door 20*a*' is opened from the closed state to the first opening angle α1, the first shaft 311*a*' is kept at the initial position B1', and the second shaft 312*a*' moves in the first section M1' around the first shaft 311*a'*.

Figure 38:
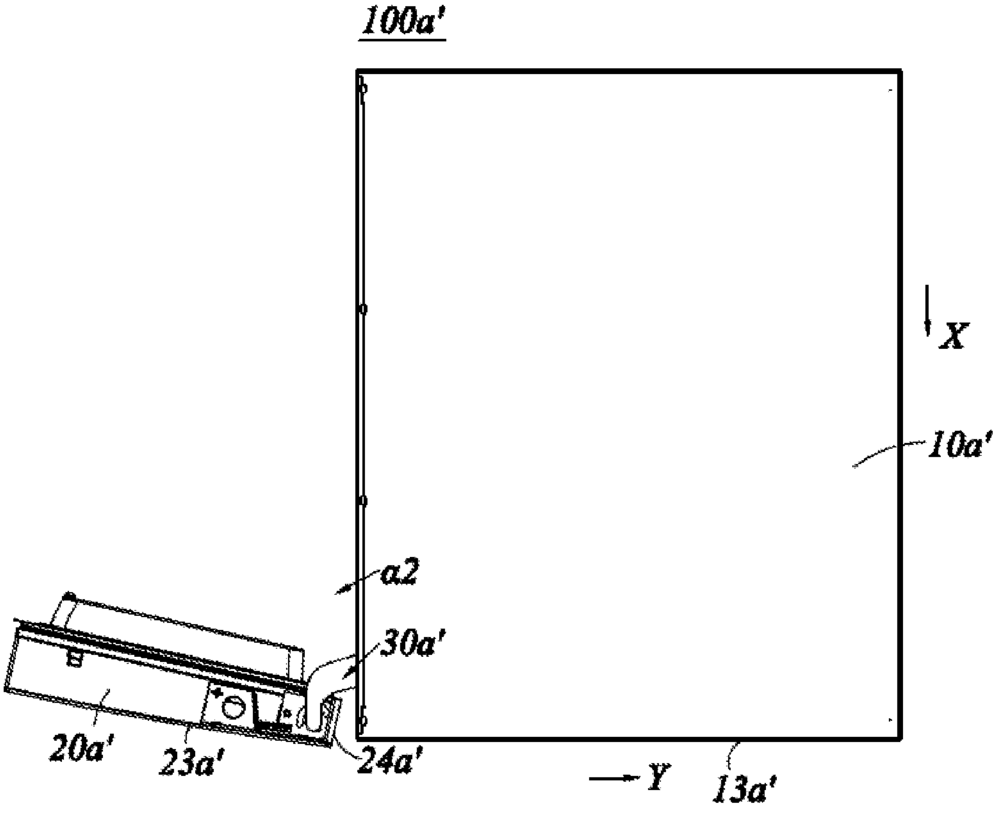
FIG. 38 is a top view of the refrigerator in the second specific example of the second embodiment opened to the second opening angle.
Figure 39:
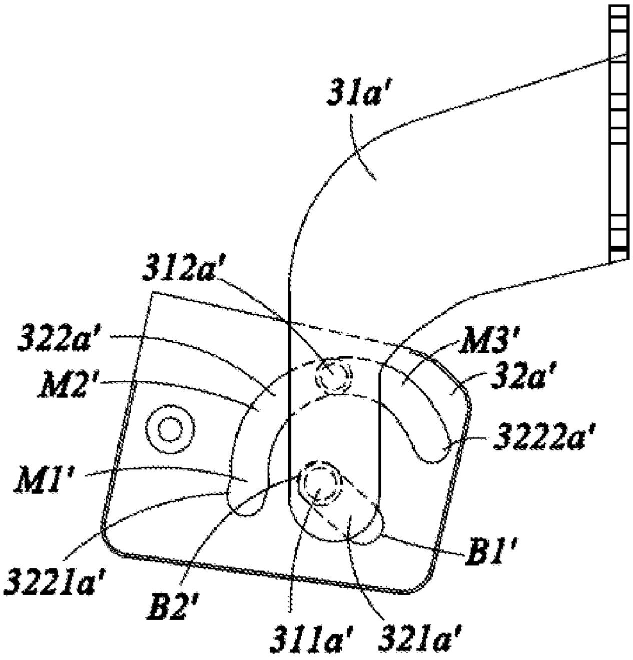
FIG. 39 is a perspective view of the hinge assembly in FIG. 38.

Referring to FIGS. 38 and 39, when the door 20*a*' is continuously opened from the first opening angle α1 to a second opening angle α2, the second shaft 312*a*' moves in the second section M2' to drive the first shaft 311*a*' to move from the initial position B1' to the pivot position B2', the door 20*a*' moves away from the cabinet 10*a*' in the first direction X, and meanwhile, the door gravity center moves towards the cabinet 10*a'*.

Figure 40:
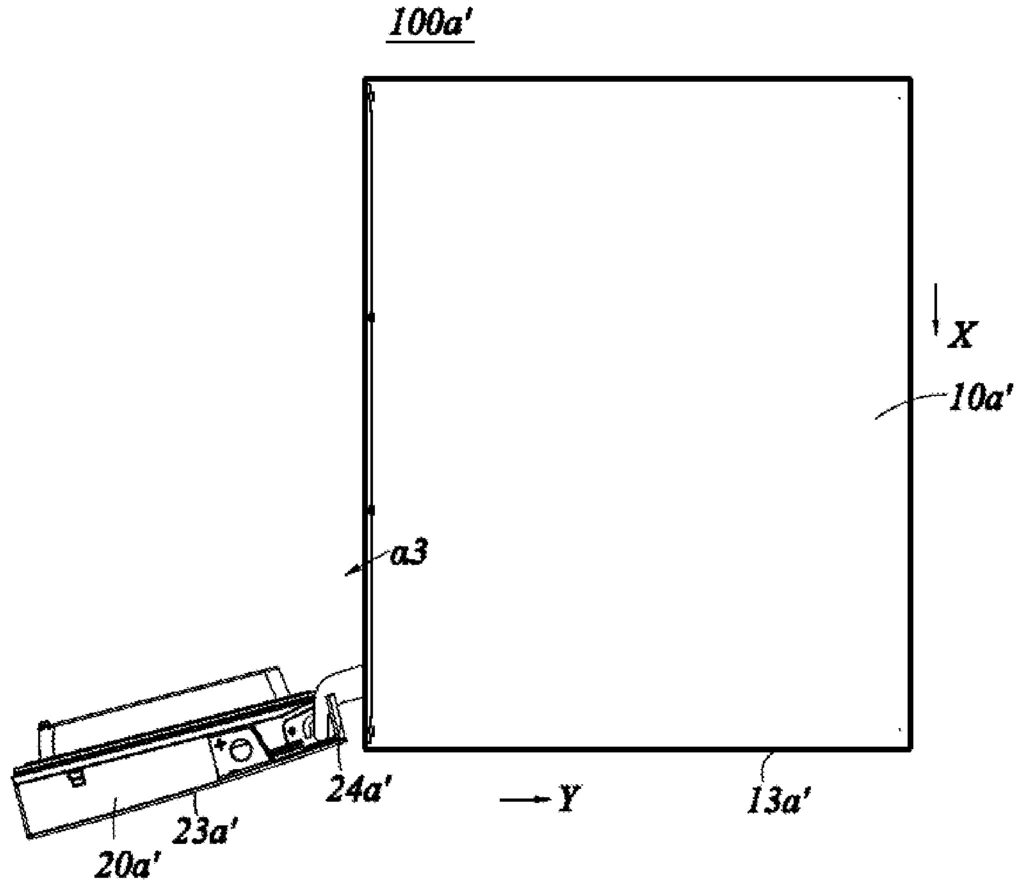
FIG. 40 is a top view of the refrigerator in the second specific example of the second embodiment opened to a third opening angle.
Figure 41:
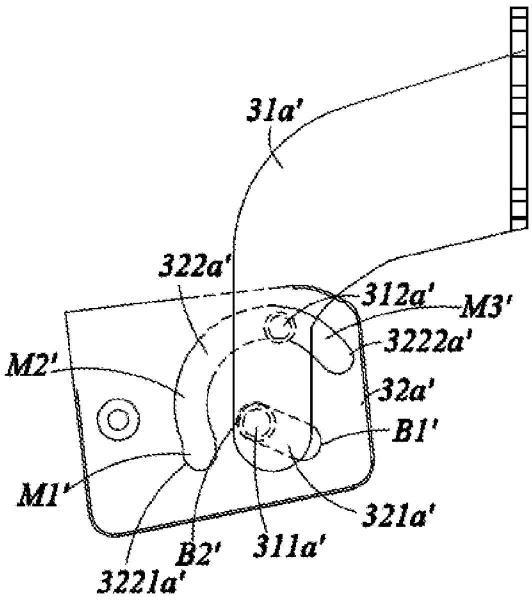
FIG. 41 is a perspective view of the hinge assembly in FIG. 40.

With reference to FIGS. 40 and 41, when the door 20*a*' is continuously opened from the second opening angle α2 to a maximum opening angle α3, the first shaft 311*a*' is kept at the pivot position B2', and the second shaft 312*a*' moves in the third section M3' around the first shaft 311*a'*.

Here, the maximum opening angle α3 is greater than 90°.

In the present specific example, the door 20*a*' includes a front wall 23*a*' apart from the cabinet 10*a*' and a side wall 24*a*' always interposed between the front wall 23*a*' and the cabinet 10*a'*.

Here, a front surface of the door 20*a*' serves as the front wall 23*a*', and a side surface of the door 20*a*' serves as the side wall 24*a'*.

A distance between the initial position B1' and the front wall 23*a*' is less than a distance between the pivot position B2' and the front wall 23*a*', and a distance between the initial position B1' and the side wall 24*a*' is less than a distance between the pivot position B2' and the side wall 24*a'*.

Specifically, a distance between a center of the first shaft 311*a*' at the initial position B1' and the front wall 23*a*' is less than a distance between a center of the first shaft 311*a*' at the pivot position B2' and the front wall 23*a'*.

A distance between the center of the first shaft 311*a*' at the initial position B1' and the side wall 24*a*' is less than a distance between the center of the first shaft 311*a*' at the pivot position B2' and the side wall 24*a'*.

A first distance is formed between the center of the first shaft 311*a*' and the front wall 23*a*', a second distance is formed between the center of the first shaft 311*a*' and the side wall 24*a*', and the first distance and the second distance are changed in the opening process of the door 20*a'*.

When the door 20*a*' is opened from the closed state to the first opening angle α1, the first distance increases, and the second distance increases, and when the door 20*a*' is continuously opened from the first opening angle α1 to the maximum opening angle α2, both the first distance and the second distance are kept unchanged.

For other descriptions of the present embodiment, reference may be made to the first embodiment, which is not repeated herein; that is, the refrigerator 100*a*' according to the present embodiment may also have a first fitting portion, a second fitting portion, or the like.

In a third embodiment of the present invention, referring to FIGS. 1 to 41, a refrigerator 100 includes a cabinet 10, a door 20 for opening and closing the cabinet 10, and a hinge assembly 30 for connecting the cabinet 10 and the door 20.

The cabinet 10 includes an accommodating chamber S and an outer side surface 13 adjacent to the hinge assembly 30 and located on an extension section of a rotation path of the door 20, and a direction from the accommodating chamber S towards the outer side surface 13 serves as a first direction X.

The hinge assembly 30 includes a first shaft 311, a first groove 321, a second shaft 312 and a second groove 322, the first shaft and the first groove are fitted with each other, and the second shaft and the second groove are fitted with each other.

The first groove 321 includes an initial position A1 and a pivot position A2, and the second groove 322 includes a first end 3221, a second end 3222, a first section M1 and a second section L2, the first end and the second end being provided oppositely, and the first section and the second section being located between the first end 3221 and the second end 3222 and connected with each other.

Referring to FIGS. 6 and 7, when the door 20 is in a closed state, the first shaft 311 is located at the initial position A1, and the second shaft 312 is located at the first end 3221.

Referring to FIGS. 8 and 9, when the door 20 is opened from the closed state to a first opening angle α1, the second shaft 312 moves in the first section M1 to drive the first shaft 311 to move from the initial position A1 to the pivot position A2, the door 20 moves away from the cabinet 10 in the first direction X.

With reference to FIGS. 10 and 11, when the door 20 is continuously opened from the first opening angle α1 to a maximum opening angle α2, the first shaft 311 is kept at the pivot position A2, and the second shaft 312 moves in the second section L2 around the first shaft 311.

Here, in the opening process of the door 20, the door 20 moves away from the cabinet 10 in the first direction X; that is, the door 20 moves away from a front end of the cabinet 10, such that the door 20 may be as far away from the cabinet 10 as possible in the first direction X, thus guaranteeing an opening degree of the cabinet 10, and avoiding a problem that drawers, racks, or the like, in the cabinet 10 are unable to be opened due to interference of the door 20.

For other descriptions of the present embodiment, reference may be made to the foregoing description, which is not repeated herein.

In conclusion, in the present invention, due to the double-shaft and double-groove fitting structure of the first shaft 311, the first groove 321, the second shaft 312, and the second groove 322, in the opening process of the door 20, the door 20 moves away from the accommodating chamber S in the first direction X, so as to guarantee the opening degree of the cabinet 10 and avoid the problem that the drawers, the racks, or the like, in the cabinet 10 are unable to be opened due to the interference of the door 20; moreover, the door gravity center moves towards the cabinet 10, thereby effectively preventing the refrigerator 100 from toppling and falling.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A refrigerator, comprising a cabinet, a door for opening and closing the cabinet, and a hinge assembly for connecting the cabinet and the door, wherein the cabinet comprises an accommodating chamber and an outer side surface adjacent to the hinge assembly and located on an extension section of a rotation path of the door, a direction from the accommodating chamber towards the outer side surface serves as a first direction, and when the door is in an opening process, the hinge assembly drives the door to move away from the cabinet in the first direction, the hinge assembly comprises a first shaft, a first groove, a second shaft and a second groove, the first shaft and the first groove are fitted with each other, the second shaft and the second groove are fitted with each other, the first shaft is located in one of the cabinet and the door, the first groove is located in the other of the cabinet and the door, the second shaft is located in one of the cabinet and the door, and the second groove is located in the other of the cabinet and the door, when the door is opened from a closed state, the first shaft moves in the first groove and the second shaft moves in the second groove, and the door is driven to move in the first direction while rotating simultaneously, or when the door is opened from a closed state, the door only rotates in situ firstly, then the first shaft moves in the first groove and the second shaft moves in the second groove, and the door is driven to move in the first direction while rotating simultaneously;

wherein the first groove comprises an initial position and a pivot position, and the second groove comprises a first end, a second end, a first section, a second section and a third section, the first end and the second end being provided oppositely, and the first section, the second section and the third section being located between the first end and the second end and connected; when the door is in the closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a second opening angle, the second shaft moves in the second section to drive the first shaft to move from the initial position to the pivot position, and the door moves away from the cabinet in the first direction; when the door is continuously opened from the second opening angle to a maximum opening angle, the first shaft is kept at the pivot position, and the second shaft moves in the third section around the first shaft.

2. The refrigerator according to claim 1, wherein the door comprises a door gravity center, and when the door is in the opening process, the hinge assembly drives the door to move away from the cabinet in the first direction, and meanwhile, the hinge assembly drives the door gravity center to move towards the cabinet.

3. The refrigerator according to claim 1, wherein the first shaft and the second shaft are located at the cabinet, and the first groove and the second groove are located at the door.

4. The refrigerator according to claim 1, wherein the door comprises a front wall apart from the cabinet and a side wall always interposed between the front wall and the cabinet, a distance between the initial position and the front wall is greater than a distance between the pivot position and the front wall, and a distance between the initial position and the side wall is less than a distance between the pivot position and the side wall.

5. The refrigerator according to claim 1, wherein the door comprises a front wall apart from the cabinet and a side wall always interposed between the front wall and the cabinet, a distance between the initial position and the front wall is less than a distance between the pivot position and the front wall, and a distance between the initial position and the side wall is less than a distance between the pivot position and the side wall.

6. The refrigerator according to claim 1, wherein the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

7. The refrigerator according to claim 6, wherein the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the first door and the second door are in the closed state, the vertical beam extends to the second door; when the first door is opened from the closed state to the first opening angle, the vertical beam rotates towards a side close to the cabinet, such that a first folding angle is formed between the first door and the vertical beam, and when the first door is continuously opened from the first opening angle to the maximum opening angle, the vertical beam and the first door are kept relatively static.

8. The refrigerator according to claim 6, wherein the door comprises a front wall apart from the cabinet and a side wall always interposed between the front wall and the cabinet, a distance between the initial position and the front wall is greater than a distance between the pivot position and the front wall, and a distance between the initial position and the side wall is less than a distance between the pivot position and the side wall.

9. The refrigerator according to claim 6, wherein the door comprises a front wall apart from the cabinet and a side wall always interposed between the front wall and the cabinet, a distance between the initial position and the front wall is less than a distance between the pivot position and the front wall, and a distance between the initial position and the side wall is less than a distance between the pivot position and the side wall.

10. A refrigerator, comprising a cabinet, a door for opening and closing the cabinet, and a hinge assembly for connecting the cabinet and the door, wherein the cabinet comprises an accommodating chamber and an outer side surface adjacent to the hinge assembly and located on an extension section of a rotation path of the door, and a direction from the accommodating chamber towards the outer side surface serves as a first direction; the hinge assembly comprises a first shaft, a first groove, a second shaft and a second groove, the first shaft and the first groove are fitted with each other, and the second shaft and the second groove are fitted with each other;

wherein the first groove comprises an initial position and a pivot position, and the second groove comprises a first end, a second end, a first section, a second section and a third section, the first end and the second end being provided oppositely, and the first section, the second section and the third section being located between the first end and the second end and connected; when the door is in a closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a second opening angle, the second shaft moves in the second section to drive the first shaft to move from the initial position to the pivot position, and the door moves away from the cabinet in the first direction; when the door is continuously opened from the second opening angle to a maximum opening angle, the first shaft is kept at the pivot position, and the second shaft moves in the third section around the first shaft.

* * * * *